US008186307B2

(12) United States Patent
Moharram et al.

(10) Patent No.: US 8,186,307 B2
(45) Date of Patent: May 29, 2012

(54) PORTABLE DEVICE AND PROCESS TO AUTOMATICALLY CLEANSE AND DRY PETS

(76) Inventors: Omayma Elsayed Moharram, Carleton Place (CA); Soher Montasser, St. Albert (CA)

( * ) Notice: Subject to any disclaimer, the term of this patent is extended or adjusted under 35 U.S.C. 154(b) by 195 days.

(21) Appl. No.: 12/840,519

(22) Filed: Jul. 21, 2010

(65) Prior Publication Data

US 2011/0061602 A1 Mar. 17, 2011

Related U.S. Application Data

(60) Provisional application No. 61/242,499, filed on Sep. 15, 2009.

(51) Int. Cl.
*A01K 13/00* (2006.01)
(52) U.S. Cl. ........................................ 119/651; 119/671
(58) Field of Classification Search .................. 119/651, 119/601, 602, 603, 604, 605, 606, 665, 669, 119/671, 673, 677, 678
See application file for complete search history.

(56) References Cited

U.S. PATENT DOCUMENTS

| | | | | | |
|---|---|---|---|---|---|
| 1,760,017 | A | * | 5/1930 | Smoot | 119/671 |
| 3,023,734 | A | * | 3/1962 | Schaub | 119/729 |
| 3,749,064 | A | * | 7/1973 | Weinstein et al. | 119/664 |
| 4,020,796 | A | * | 5/1977 | Grifa | 119/671 |
| 4,057,032 | A | * | 11/1977 | Dimitriadis | 119/671 |
| 4,083,328 | A | * | 4/1978 | Baker | 119/673 |
| 4,382,424 | A | | 5/1983 | Altissimo | |
| 4,407,234 | A | * | 10/1983 | Kleman | 119/672 |
| 4,549,502 | A | * | 10/1985 | Namdari | 119/664 |
| 4,930,453 | A | * | 6/1990 | Laliberte | 119/671 |
| 5,193,487 | A | * | 3/1993 | Vogel | 119/671 |
| 5,243,931 | A | * | 9/1993 | McDonough | 119/671 |
| 5,259,339 | A | * | 11/1993 | McLaughlin | 119/676 |
| 5,279,257 | A | * | 1/1994 | Temby | 119/676 |
| 5,448,966 | A | * | 9/1995 | McKinnon et al. | 119/676 |
| 5,632,231 | A | * | 5/1997 | Moore | 119/671 |
| 5,678,511 | A | * | 10/1997 | Day | 119/676 |
| 5,794,570 | A | * | 8/1998 | Foster et al. | 119/756 |
| 6,688,257 | B2 | * | 2/2004 | Lee | 119/671 |
| 7,040,254 | B1 | * | 5/2006 | Rucker et al. | 119/675 |
| 7,107,937 | B1 | * | 9/2006 | Anderson | 119/671 |

(Continued)

*Primary Examiner* — Yvonne Abbott

(57) ABSTRACT

Portable grooming and spray devices and processes to automatically cleanse (wash, rinse, and purify) and dry pets are disclosed. A portable grooming device comprises a housing container and situated inside the housing container is a portable spray device having a pet-shape body with four legs. The four legs of the portable spray device safely constrain pets' movements inside the portable spray device throughout various processes to cleanse and dry the pets. The portable spray device comprises plurality of connectors for connecting various apparatus for supplying water, liquid composition, air flow, and the like to the portable spray device. The portable spray device comprises a spray device cavity and plurality of spray nozzles where the spray device cavity channels the water, liquid composition, and air flow to the plurality of spray nozzles and the spray nozzles spray the water, liquid composition, and air flow on a pet's neck, body, tail, and four legs to cleanse and dry the pet. The portable spray device can be used separately or as part of the portable grooming device. The portable grooming device and the portable spray device are formed by rectangular or cylindrical shape sheets of light fiber glass and plastic materials. The processes to automatically cleanse and dry a pet comprise wash, rinse, purify, and dry cycles where the spray nozzles of the portable spray device spray the water, liquid composition, and air flow on the pet's neck, body, tail, and four legs from all directions to ensure the pet's neck, body, tail, and four legs are thoroughly clean and dry.

24 Claims, 20 Drawing Sheets

U.S. PATENT DOCUMENTS

| | | | |
|---|---|---|---|
| 7,421,978 B2 * | 9/2008 | Price | 119/671 |
| 7,497,188 B2 * | 3/2009 | Cho | 119/671 |
| 7,503,284 B2 * | 3/2009 | Boylan | 119/676 |
| 7,921,812 B1 * | 4/2011 | Carrillo | 119/604 |
| 8,061,304 B1 * | 11/2011 | Ramsay et al. | 119/671 |
| 8,069,821 B1 * | 12/2011 | Green | 119/671 |
| 8,127,721 B2 * | 3/2012 | Moran | 119/713 |
| 2003/0196608 A1 * | 10/2003 | Lee | 119/651 |
| 2007/0039559 A1 * | 2/2007 | Foster | 119/676 |
| 2009/0101077 A1 * | 4/2009 | Shaham et al. | 119/673 |
| 2011/0017147 A1 * | 1/2011 | Petruzzi | 119/604 |
| 2012/0048209 A1 * | 3/2012 | Tarbutton | 119/673 |

* cited by examiner

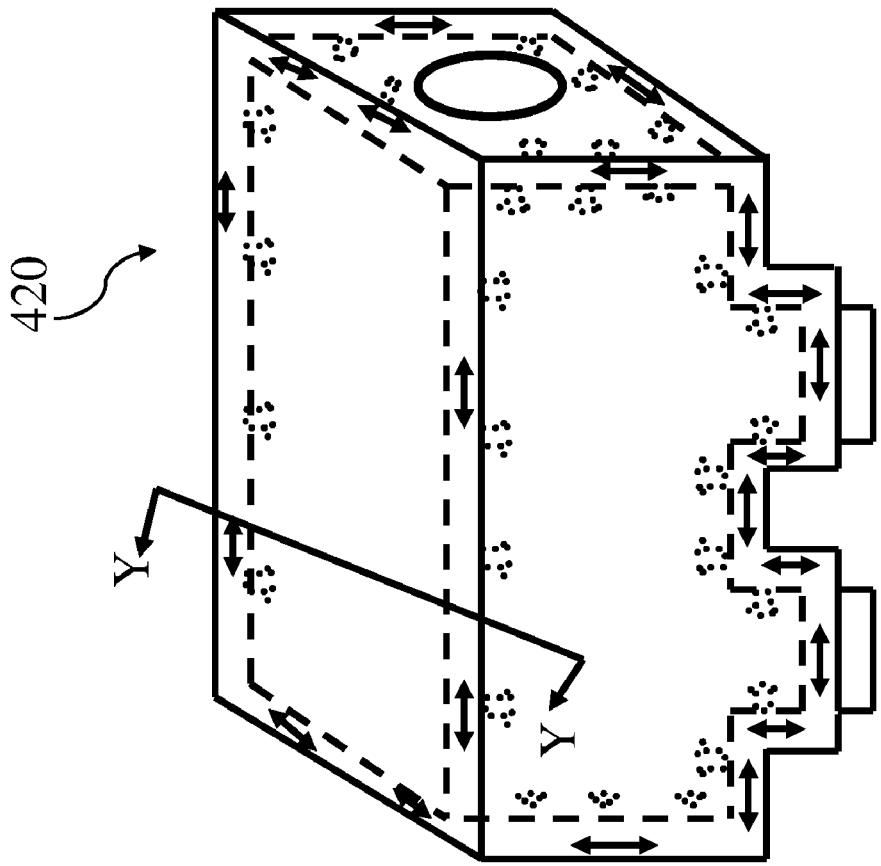
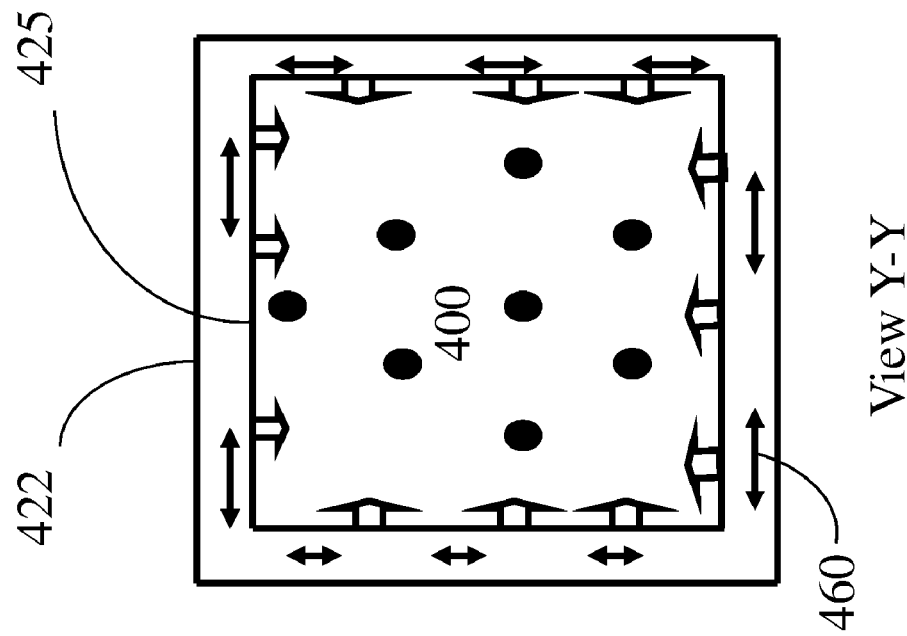
Figure 11

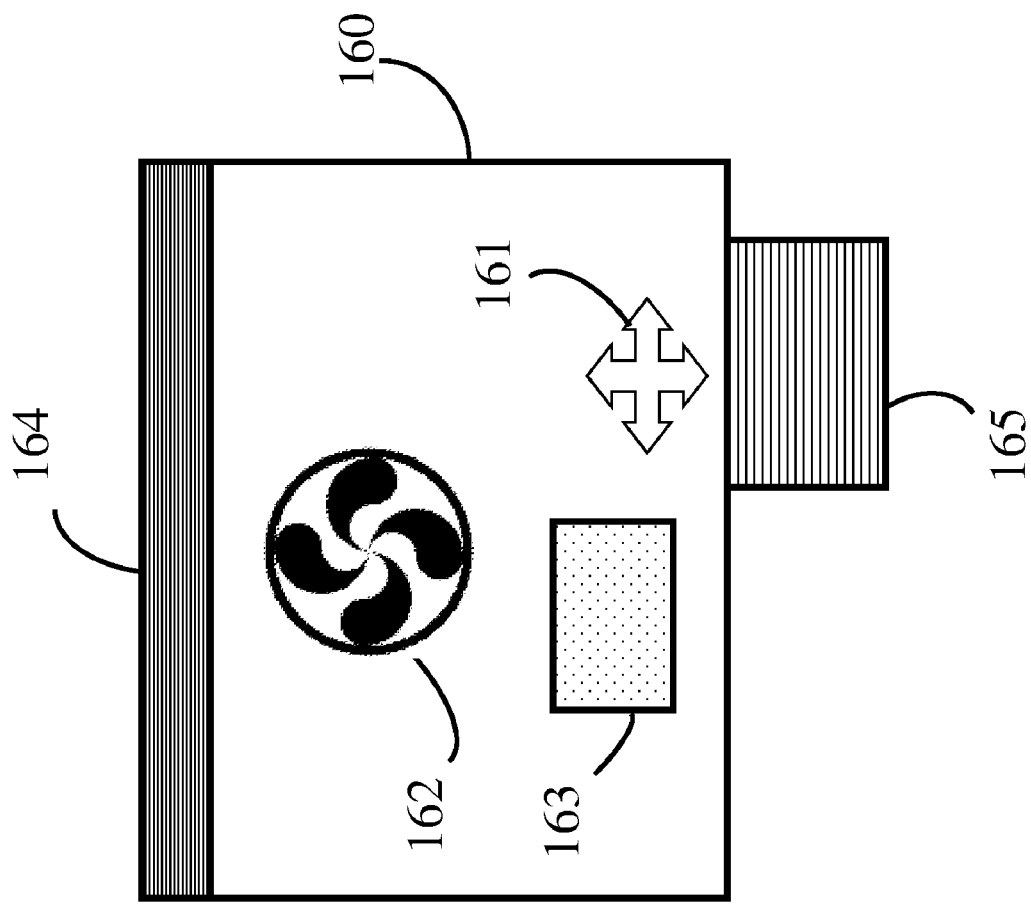
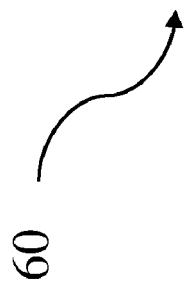
Figure 13

PORTABLE DEVICE AND PROCESS TO AUTOMATICALLY CLEANSE AND DRY PETS

RELATED APPLICATION

This application claims benefit from U.S. Provisional Application Ser. No. 61/242,499, entitled "Portable device and process to automatically cleanse and dry pets", and filed on Sep. 15, 2009.

FIELD OF THE INVENTION

This invention relates generally to bathing animals and, in particular, to portable device and process to automatically cleanse (wash, rinse, and purify) and dry pets.

BACKGROUND OF THE INVENTION

Prior art references propose wide varieties of devices and apparatus for bathing pets. These devices and apparatus have shortcomings with respect to cost of manufacture; portability; mechanization of washing, rinsing, and drying processes for pets; and lack of comfort for the pets and pets' owners.

Pets' owners need devices and apparatus for bathing pets that would be easy to use; would be economical; and would be transportable from one place to another.

Consequently, there is a need in the industry to provide portable device and process to automatically cleanse (wash, rinse, and purify) and dry pets (such as dogs, cats, birds, and the like) that are convenient and effective for both the pets' owners and the animals.

SUMMARY OF THE INVENTION

It is an object of the present invention to provide portable device and process to automatically cleanse (wash, rinse, and purify) and dry pets.

The invention, therefore, according to one aspect provides a portable spray device which comprises a pet-shape body with four legs having a hollow interior for placing a pet inside the portable spray device to automatically cleanse and dry the pet.

The portable spray device comprises plurality of spray nozzles having spray nozzles heads and nozzles base connectors. The nozzles base connectors are connected to the pet-shape body with four legs with the spray nozzles heads are directed toward the hollow interior of the pet-shape body with four legs.

The portable spray device comprises a spray device top, a spray device bottom, and a spray device opening which is formed on the spray device bottom for a pet's head. The portable spray device also comprises plurality of connectors which are formed on the spray device top for connecting a hose connected to a water source, a wash and rinse apparatus, a liquid composition apparatus, an air blower, and the like for supplying water, liquid composition (that is, soap, shampoo, medical or non-medical liquid composition), and air flow to the portable spray device.

The portable spray device further comprises a spray device cavity which is formed within the pet-shape body with four legs for channeling the water, liquid composition, and air flow to the plurality of spray nozzles where the spray nozzles heads spray the water, liquid composition, and air flow on the pet.

In accordance to a first embodiment of the present invention, the portable spray device is formed by rectangular shape sheets of light fiber glass and plastic materials.

In accordance to a second embodiment of the present invention, the portable spray device is formed by cylindrical shape sheets of light fiber glass and plastic materials.

Another aspect of the present invention provides a portable grooming device for pets. The portable grooming device comprises a housing container having a housing container cover and a hollow bottom container which has a housing container opening for a pet's head. Situated inside the hollow bottom container of the housing container is the portable spray device described previously. The spray device opening and the housing container opening centers are coinciding.

The portable grooming device further comprises plurality of access openings which are formed on the housing container cover for easy access of the plurality of connectors on the spray device top of the portable spray device.

The housing container comprises homing legs formed inside the hollow bottom container for receiving the four legs of the portable spray device. The homing legs have lock and release mechanism for locking each of the four legs of the portable spray device inside the homing legs of the hollow bottom container, and for releasing each of the four legs of the portable spray device from the homing legs of the hollow bottom container.

The housing container further comprises a perforated mat having four mat openings which are positioned under the homing legs of the hollow bottom container of the housing container. The perforated mat drains waste water and liquid composition away from the pet's rear and front legs. The housing container also comprises a drain formed on the hollow bottom container of the housing container for draining waste water and liquid composition away from the portable grooming device.

The housing container is fitted with plurality of handles formed on the housing container cover and the hollow bottom container; plurality of hinges for connecting the housing container cover and the hollow bottom container; a belt tied to the plurality of handles on the hollow bottom container for carrying and transporting the portable grooming device from one place to another; and plurality of wheels and breaking levers system for facilitating the portable grooming device moves.

In accordance to a third embodiment of the present invention, the housing container and the portable spray device are formed by rectangular shape sheets of light fiber glass and plastic materials.

In accordance to a fourth embodiment of the present invention, the housing container and the portable spray device are formed by cylindrical shape sheets of light fiber glass and plastic materials.

Another aspect of the present invention provides a process to automatically cleanse and dry a pet having four legs (left and right front legs and left and right rear legs), a neck, a head, a body, and a tail. The process comprises the steps of placing the portable spray device on the floor (or on a table having a flat surface) close to a faucet connected to a water supply on premises, where the faucet has a built-in selector switch having cold, warm, hot, and off positions.

The process comprises the steps of opening the spray device top and placing the pet inside the pet-shape body of the portable spray device; ensuring that the pet's head is outside the spray device opening and the pet's front and rear legs are positioned within the four legs of the portable spray device; and closing the portable spray device with the spray device top.

The steps of the process include connecting wash, purify, rinse, and dry apparatus (that is, an air blower, a hose, a wash and rinse apparatus, and a liquid composition apparatus) to the plurality of connectors on the spray device top. Then, wash or purify, rinse and dry the pet's neck, body, tail, and four legs for a period of time. The steps also include opening the spray device top of the portable spray device to retrieve the clean and dry pet from the portable spray device.

Another aspect of the present invention provides a process for grooming a pet having four legs (left and right front legs and left and right rear legs), a neck, a head, a body, and a tail. The process comprises the steps of placing the portable grooming device on the floor (or on a table having a flat surface) close to a faucet connected to a water supply on premises, where the faucet has a built-in selector switch having cold, warm, hot, and off positions.

The process comprises the steps of opening the housing container cover and removing the spray device top of the portable spray device; placing the pet inside the pet-shape body; ensuring the pet's head is outside the housing container opening and the spray device opening, and the pet's front and rear legs are positioned within the four legs of the portable spray device; and closing the portable spray device with the spray device top and the housing container with the housing container cover.

The steps of the process include connecting wash, purify, rinse, and dry apparatus to the plurality of connectors on the spray device top to wash, purify, rinse, and dry the pet's neck, body, tail, and four legs for a period of time. The steps also include opening the housing container cover of the housing container and the spray device top of the portable spray device to retrieve the clean and dry pet from the portable spray device.

Advantageously, the present invention provides a portable spray device which has a pet-shape body with four legs so that the spray nozzles which are formed inside the portable spray device spray the liquid composition (water and soap, shampoo, medical, or non-medical liquid composition) and air flow on the pet's body including the tail and four legs from all directions to ensure the pet's body including the tail and four legs are thoroughly wash, rinse, purify, and dry.

Further, the four legs of the portable spray device safely constrain pets' movements to better control the processes to cleanse and dry the pets. The space between the spray nozzles and the body of the pet is sufficient in size to also ensure the safety of the pet.

Moreover, the portable grooming device is made of light fiber glass and plastic materials and fitted with handles, a belt, and wheels for facilitating carrying and transporting the portable grooming device from one place to another. The housing container and the portable spray device are formed by rectangular or cylindrical shape sheets of light fiber glass and plastic materials.

Additionally, the perforated mat of the housing container drains waste water and liquid composition away from the rear and front legs of the pet during the wash, rinse, and purify cycles. The drain of the housing container connects to a sink source on the premises using a commercially available hose for discharging the waste water and liquid composition away from the portable grooming device.

The embodiments of the present invention provide portable device and process to automatically cleanse (wash, rinse, and purify) and dry pets (such as dogs, cats, birds, and the like) that would overcome the shortcomings and limitations of the prior art references.

BRIEF DESCRIPTION OF THE DRAWINGS

The invention will be better understood from the following description of preferred embodiments together with reference to the accompanying drawing, in which:

FIG. 11 is another enlarged section taken through the spray device bottom of the portable spray device of FIG. 4;

FIG. 13 is a diagram illustrating an air blower;

Similar references are used in different figures to denote similar components.

DETAILED DESCRIPTION OF THE PREFERRED EMBODIMENTS

Figure 1:
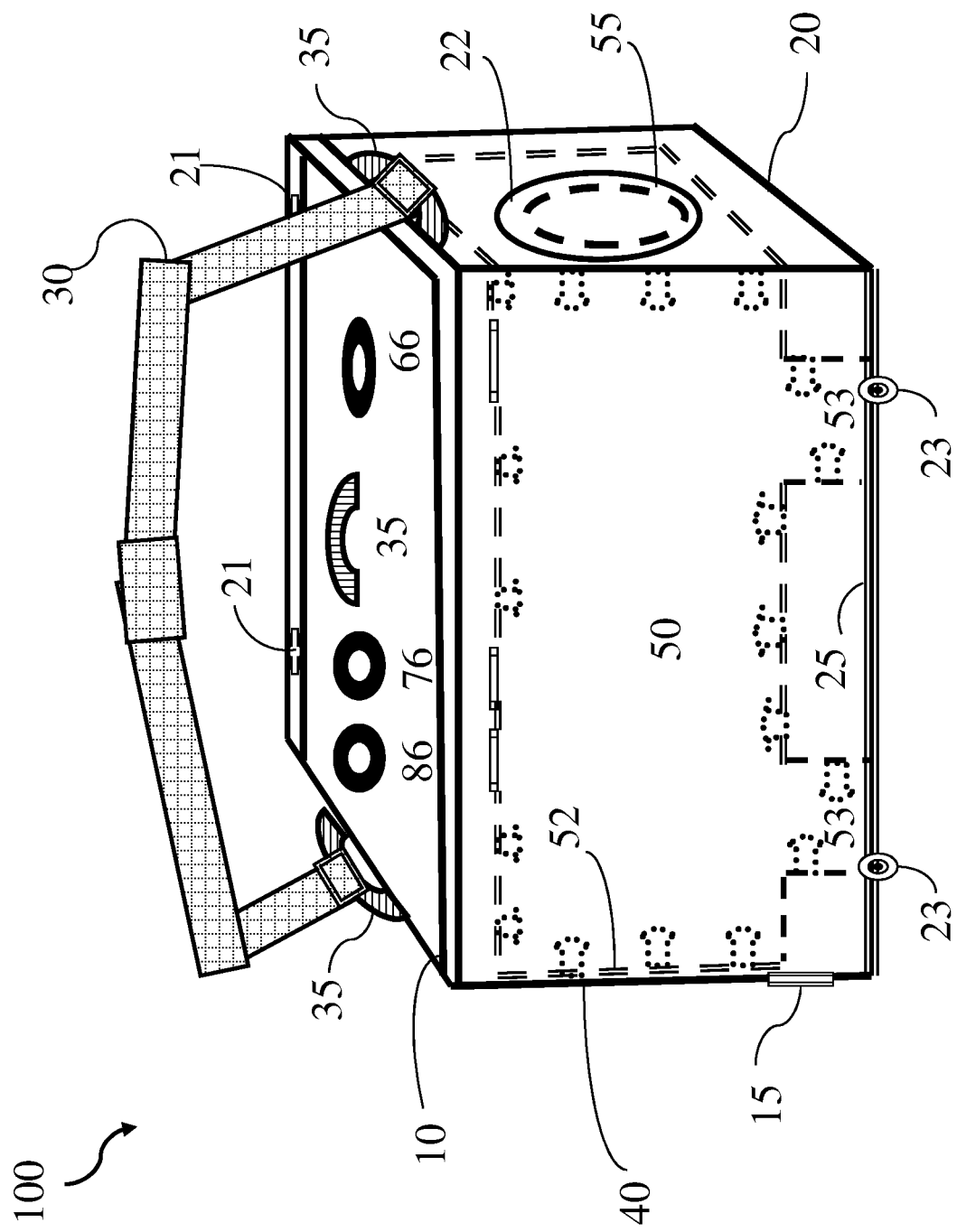
FIG. 1 is a diagram illustrating a portable grooming device for pets.

FIG. 1 shows a diagram illustrating a portable grooming device (100) for pets. The portable grooming device (100) comprises a housing container (40) having a housing container cover (10), a hollow bottom container (20) which has a housing container opening (22) for a pet's head, and plurality of access openings (66, 76, 86) formed on the housing container cover (10).

Situated inside the housing container (40) is a portable spray device (50) which comprises a pet-shape body (52) with four legs (shown collectively as 53) having a hollow interior for placing a pet inside the portable spray device, and a spray device opening (55) which is formed on the pet-shape body (52) for the pet's head. The spray device opening (55) and the housing container opening (22) centers are coinciding.

The housing container (40) comprises a perforated mat (25) for draining waste water and liquid composition away from the pet's rear and front legs and a drain (15) formed on the hollow bottom container (20) for draining waste water and liquid composition away from the portable grooming device (100).

The housing container (40) is fitted with plurality of handles (shown collectively as 35) formed on the housing container cover (10) and the hollow bottom container (20), plurality of hinges (shown collectively as 21) for connecting the housing container cover (10) and the hollow bottom container (20), a belt (30) tied to the plurality of handles (shown collectively as 35) on the hollow bottom container (20) for carrying and transporting the portable grooming device (100) from one place to another, and plurality of wheels and breaking levers system (shown collectively as 23) for facilitating the portable grooming device (100) moves.

The housing container (40) and the portable spray device (50) of the portable grooming device (100) of FIG. 1 are formed by rectangular shape sheets of light fiber glass and plastic materials.

Figure 2:
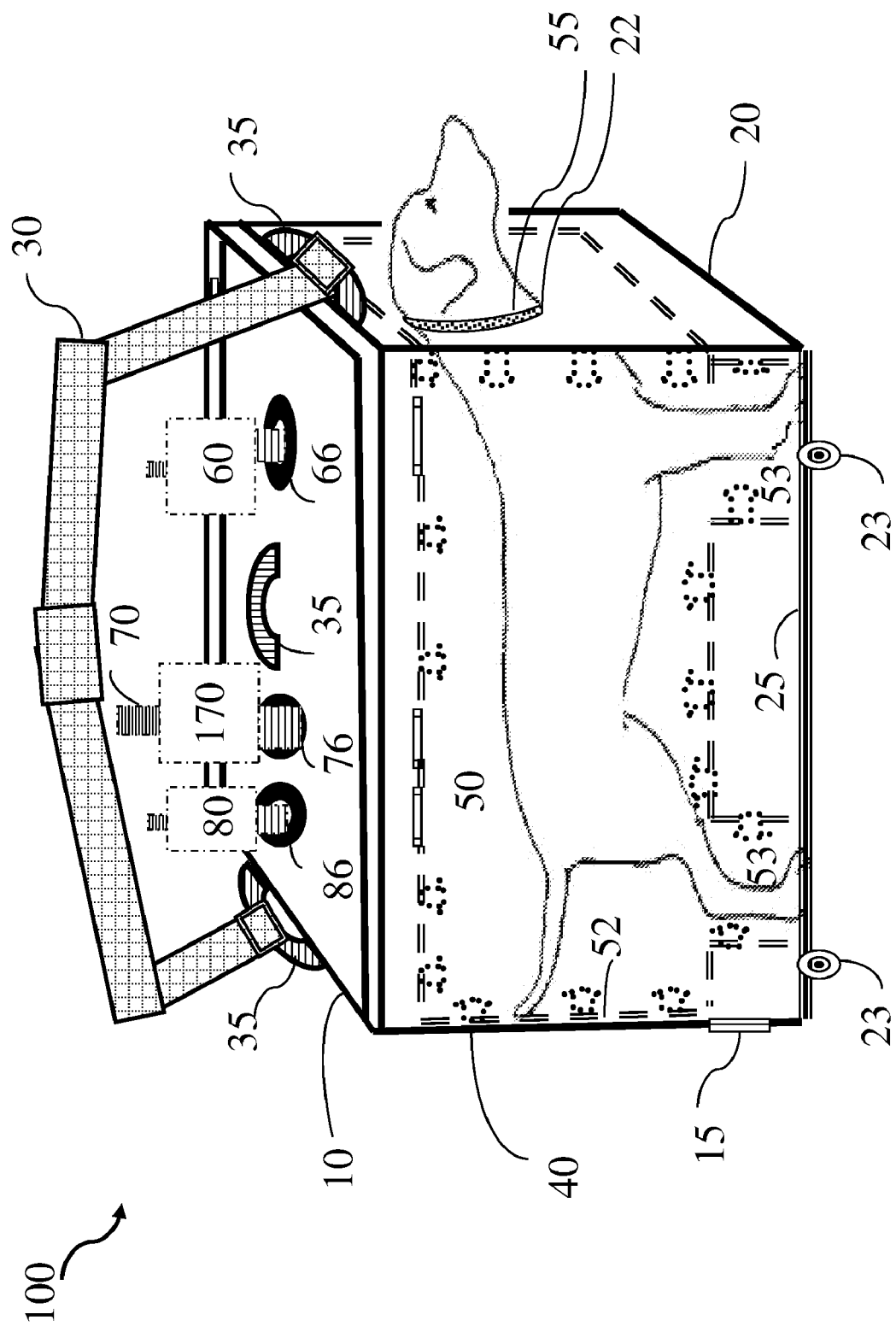
FIG. 2 is a diagram illustrating a pet (a dog) placed inside the portable grooming device of FIG. 1.

FIG. 2 shows a pet (a dog) placed inside the portable grooming device (100) of FIG. 1 to automatically cleanse and dry the pet. The portable grooming device (100) is connected to wash, rinse, purify, and dry apparatus via the plurality of access openings (66, 76, 86) on the housing container cover (10). The apparatus include an air blower (60), a hose (70), a wash and rinse apparatus (170), a liquid composition apparatus (80), and the like.

Figure 3:
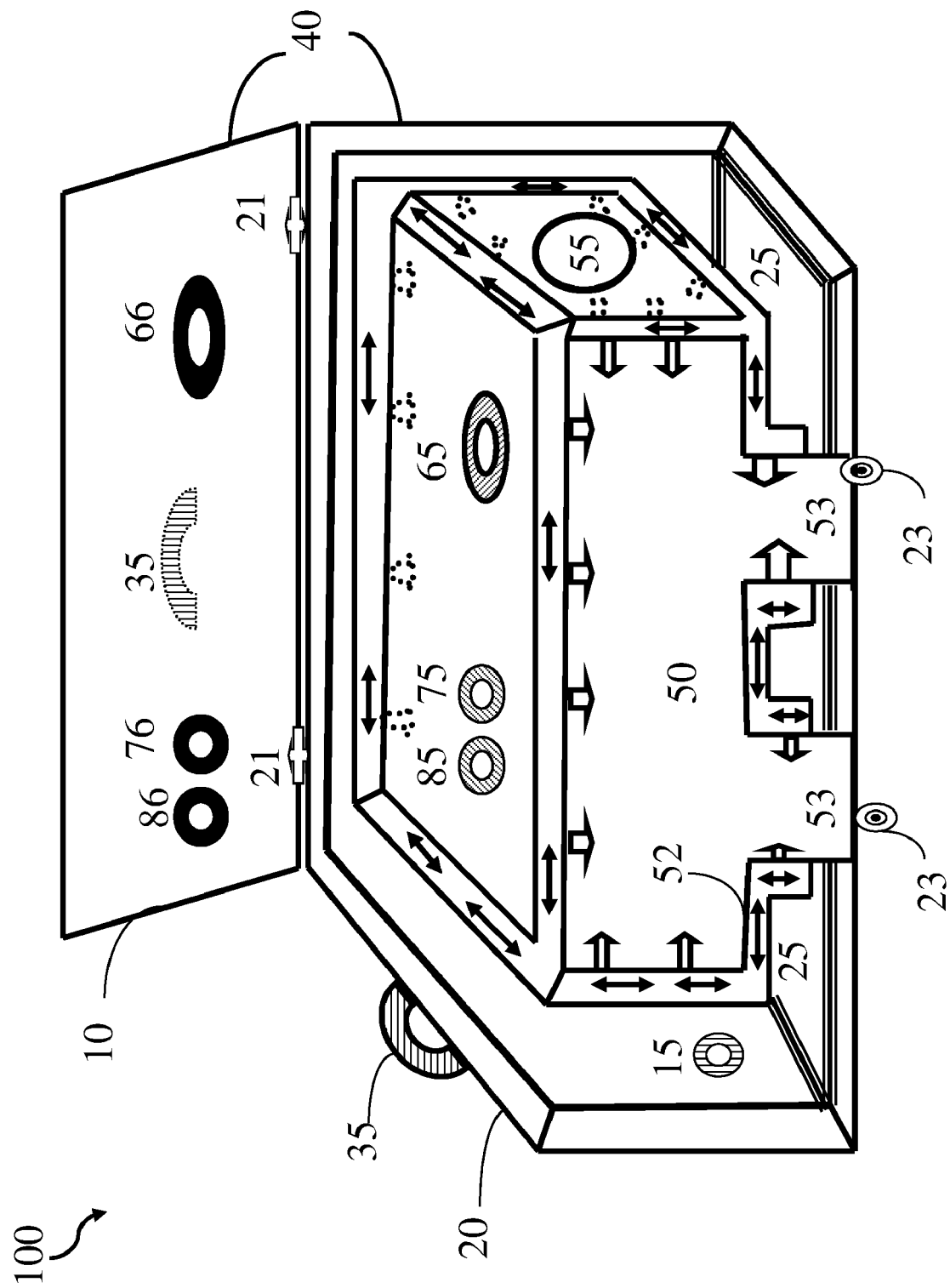
FIG. 3 is a diagram illustrating a view inside the portable grooming device of FIG. 1, with a housing container cover opened and two-side walls of a hollow bottom container removed.

FIG. 3 shows a view of the portable grooming device (100) of FIG. 1 with the housing container cover (10) of the housing container (40) is opened and two-side walls of the hollow bottom container (20) of the housing container (40) are removed. Plurality of connectors (65, 75, 85) are formed on the portable spray device (50) for connecting the wash, rinse, purify, and dry apparatus of FIG. 2.

Figure 4:
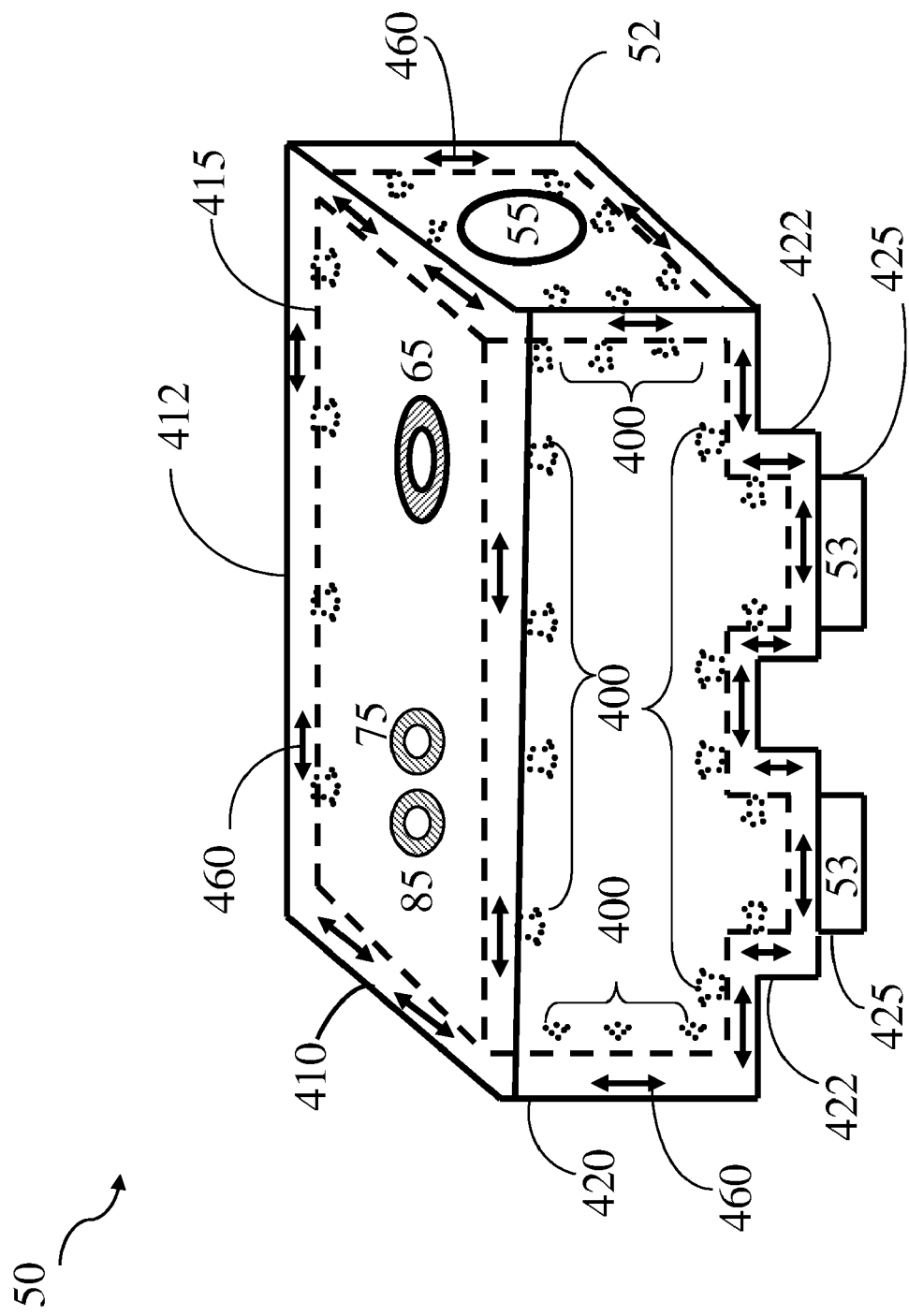
FIG. 4 is a diagram illustrating a portable spray device to automatically cleanse and dry pets for the portable grooming device of FIG. 1.

FIG. 4 shows the portable spray device (50) of the portable grooming device (100) of FIG. 1. The portable spray device (50) comprises a spray device top (410) having a built-in flexible lock and release mechanism (not shown), an inner stratum (415) with built-in plurality of connectors, and an outer stratum (412). A top device cavity is formed between the inner stratum (415) and the outer stratum (412) of the spray device top (410).

The portable spray device (50) further comprises a spray device bottom (420) having an inner stratum (425) with built-in plurality of connectors and an outer stratum (422). A bottom device cavity is formed between the inner stratum (425) and the outer stratum (422) of the spray device bottom (420). A spray device cavity (460) is formed within the portable spray device (50) by connecting the top device cavity and the bottom device cavity using the built-in flexible lock and release mechanism (not shown) of the spray device top (410).

The portable spray device (50) comprises plurality of spray nozzles (400) having spray nozzles heads and nozzles base connectors. The nozzles base connectors are connected to the plurality of connectors on the inner stratum (415, 425) of the spray device top (410) and the spray device bottom (420) with the spray nozzles heads are directed toward the hollow interior of the pet-shape body (52) with four legs (shown collectively as 53).

The plurality of connectors (65, 75, 85) are formed on the spray device top (410) of the portable spray device (50). The plurality of connectors (65, 75, 85) comprise an A-connector (65), a B-connector (75), and a C-connector (85) for connecting the wash, rinse, purify, and dry apparatus of FIG. 2.

The plurality of access openings (66, 76, 86) of FIGS. 1 and 2 which are formed on the housing container cover (10) facilitate easy access to the plurality of connectors (65, 75, 85) on the spray device top (410) of the portable spray device (50) of FIGS. 3 and 4.

Figure 5:
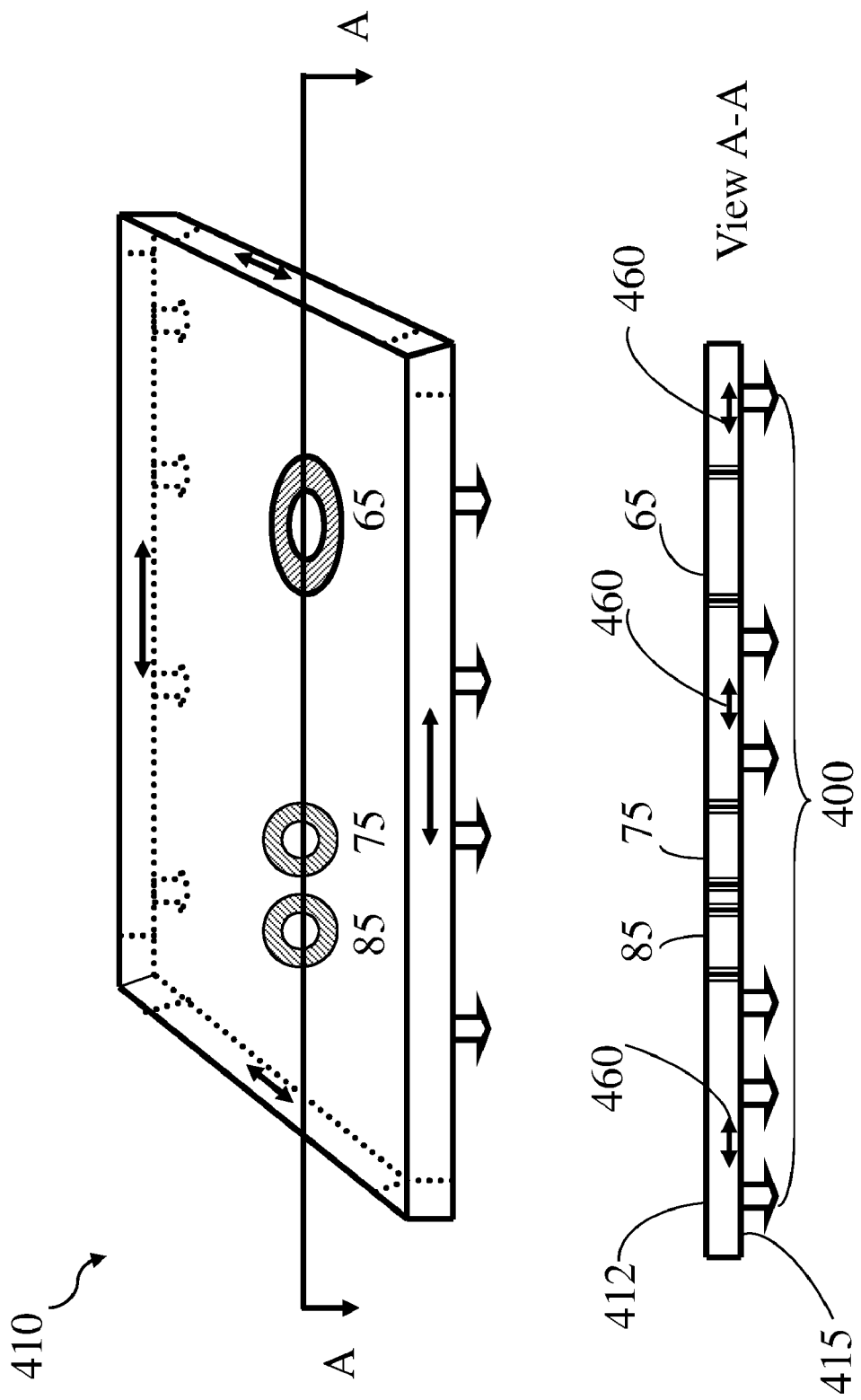
FIG. 5 is an enlarged section taken through a spray device top of the portable spray device of FIG. 4.

FIG. 5 shows an enlarged section taken through the spray device top (410) of the portable spray device (50) of FIG. 4. View A-A shows the A-connector (65), the B-connector (75), and the C-connector (85) which are formed on the spray device top (410). View A-A shows the spray device cavity (460) and the plurality of spray nozzles (400) which have spray nozzles heads and nozzles base connectors and the nozzles base connectors are connected to the plurality of connectors on the inner stratum (415) of the spray device top (410) with the spray nozzles heads are directed downward.

Figure 6:
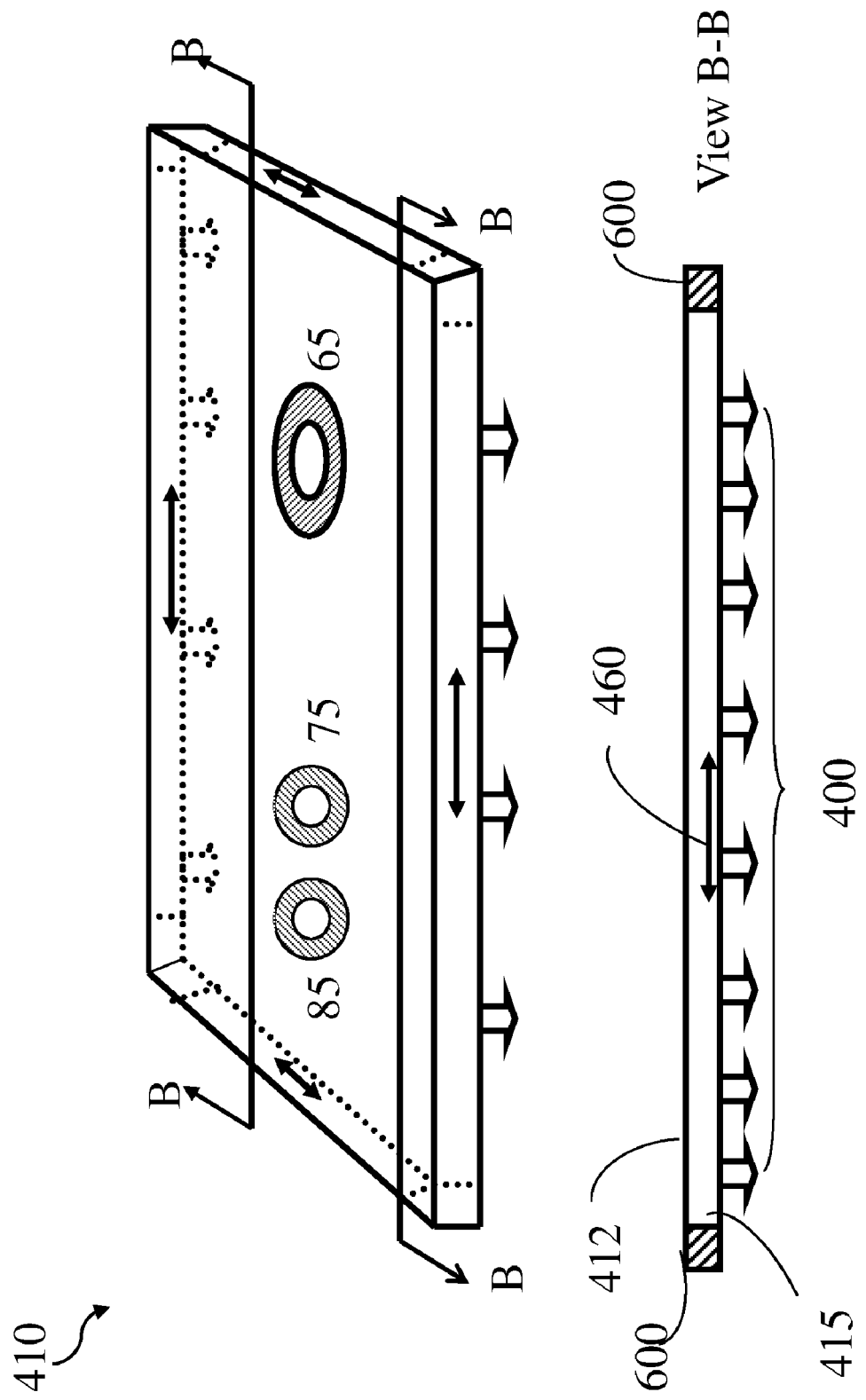
FIG. 6 is another enlarged section taken through the spray device top of the portable spray device of FIG. 4.

FIG. 6 shows another enlarged section taken through the spray device top (410) of the portable spray device (50) of FIG. 4. View B-B shows the spray device top (410) with a built-in flexible lock and release mechanism (600) for locking and releasing the top device cavity of the spray device top (410) and the bottom device cavity of the spray device bottom (420) of the portable spray device (50).

Figure 7:
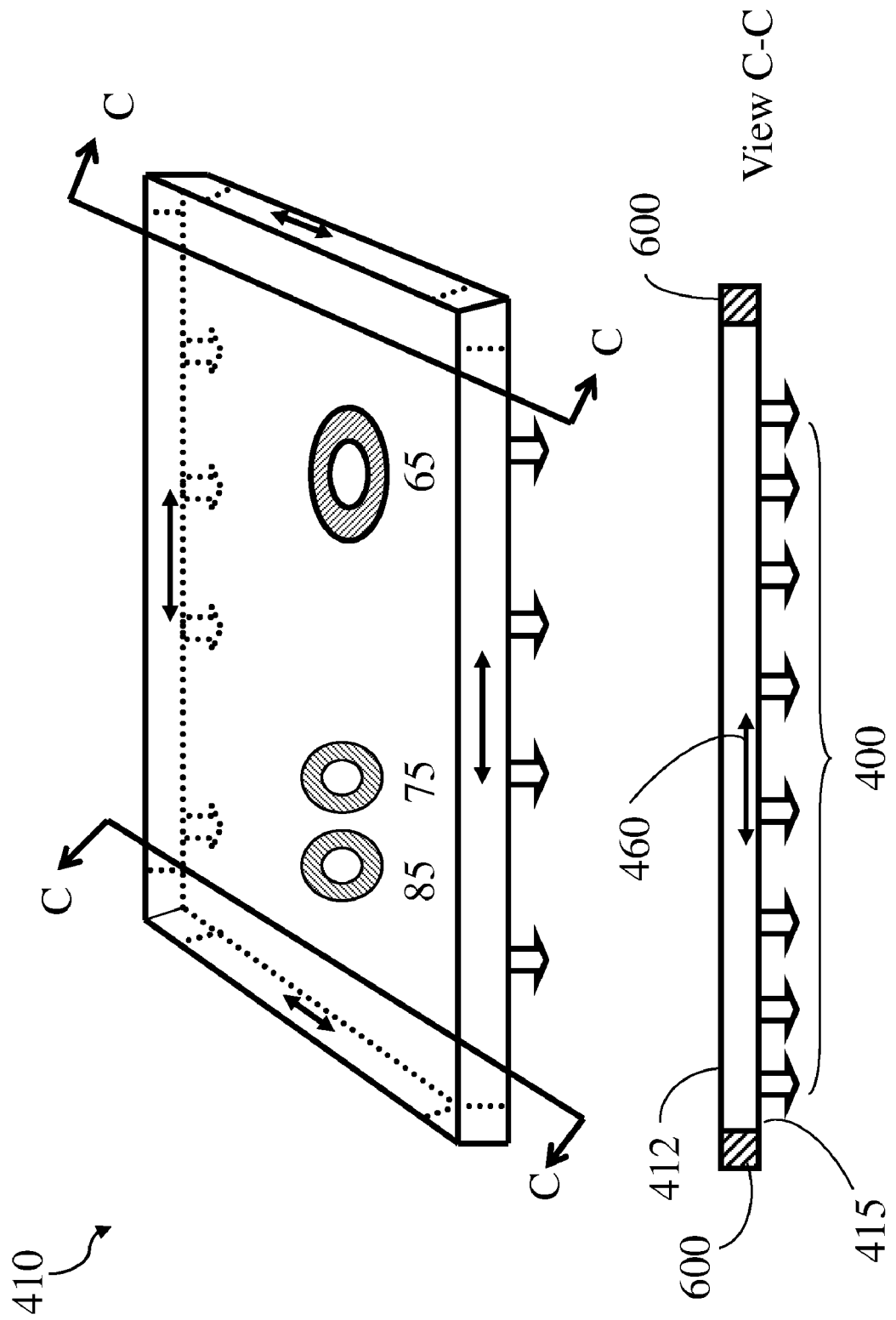
FIG. 7 is another enlarged section taken through the spray device top of the portable spray device of FIG. 4.

FIG. 7 shows another enlarged section taken through the spray device top (410) of the portable spray device (50) of FIG. 4. View C-C shows another side of the spray device top (410) with the built-in flexible lock and release mechanism (600) for locking and releasing the top device cavity of the spray device top (410) and the bottom device cavity of the spray device bottom (420) of the portable spray device (50).

Figure 8:
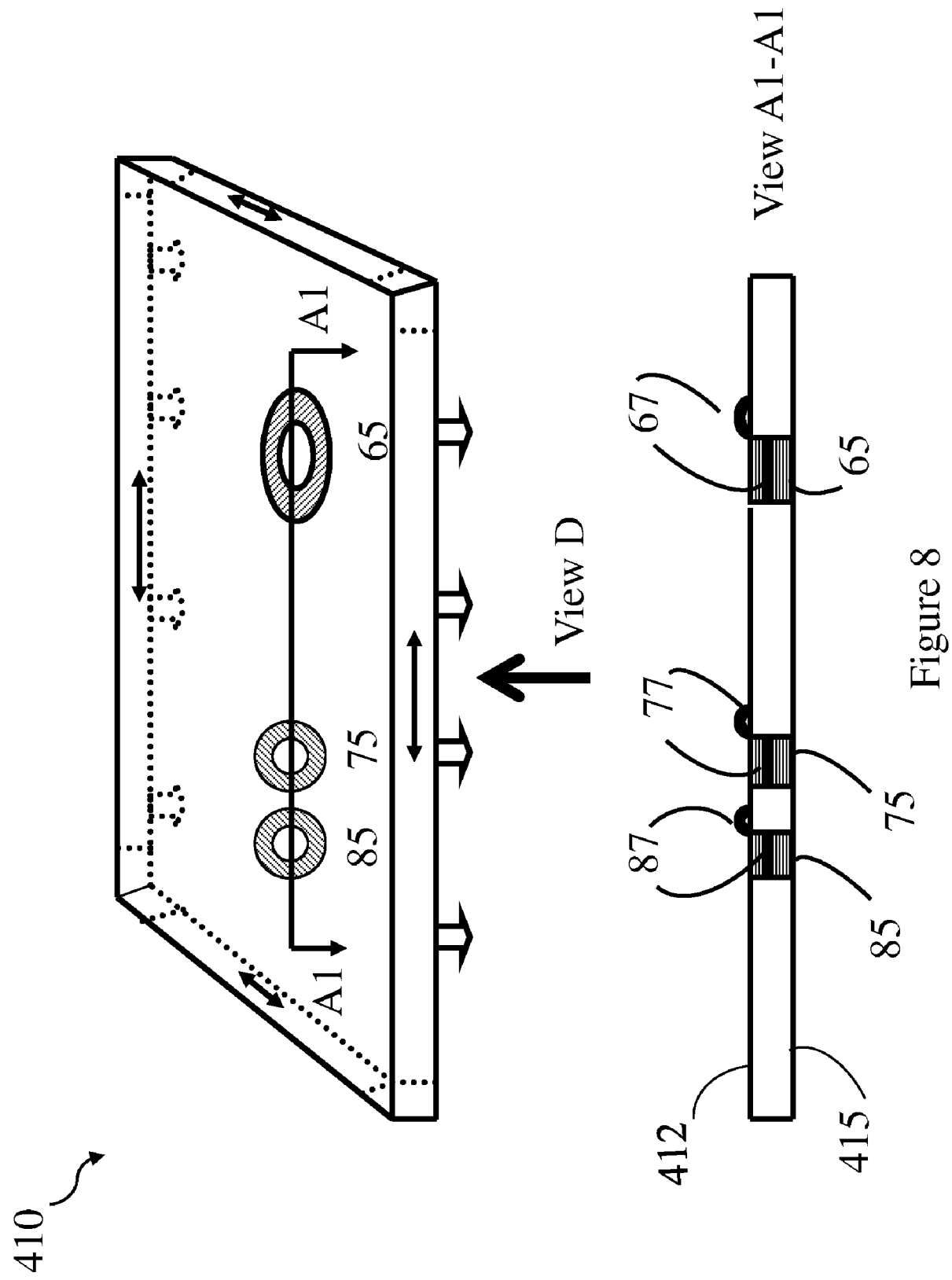
FIG. 8 is another enlarged section taken through the spray device top of the portable spray device of FIG. 4.

FIG. 8 shows another enlarged section taken through the spray device top (410) of the portable spray device (50) of FIG. 4. View A1-A1 shows the A-connector (65) which has an A-connector selector switch (67) having "on" and "off" positions, the B-connector (75) which has a B-connector selector switch (77) having "on" and "off" positions, and the C-connector (85) which has a C-connector selector switch (87) having "on" and "off" positions which are formed on the spray device top (410).

Figure 9:
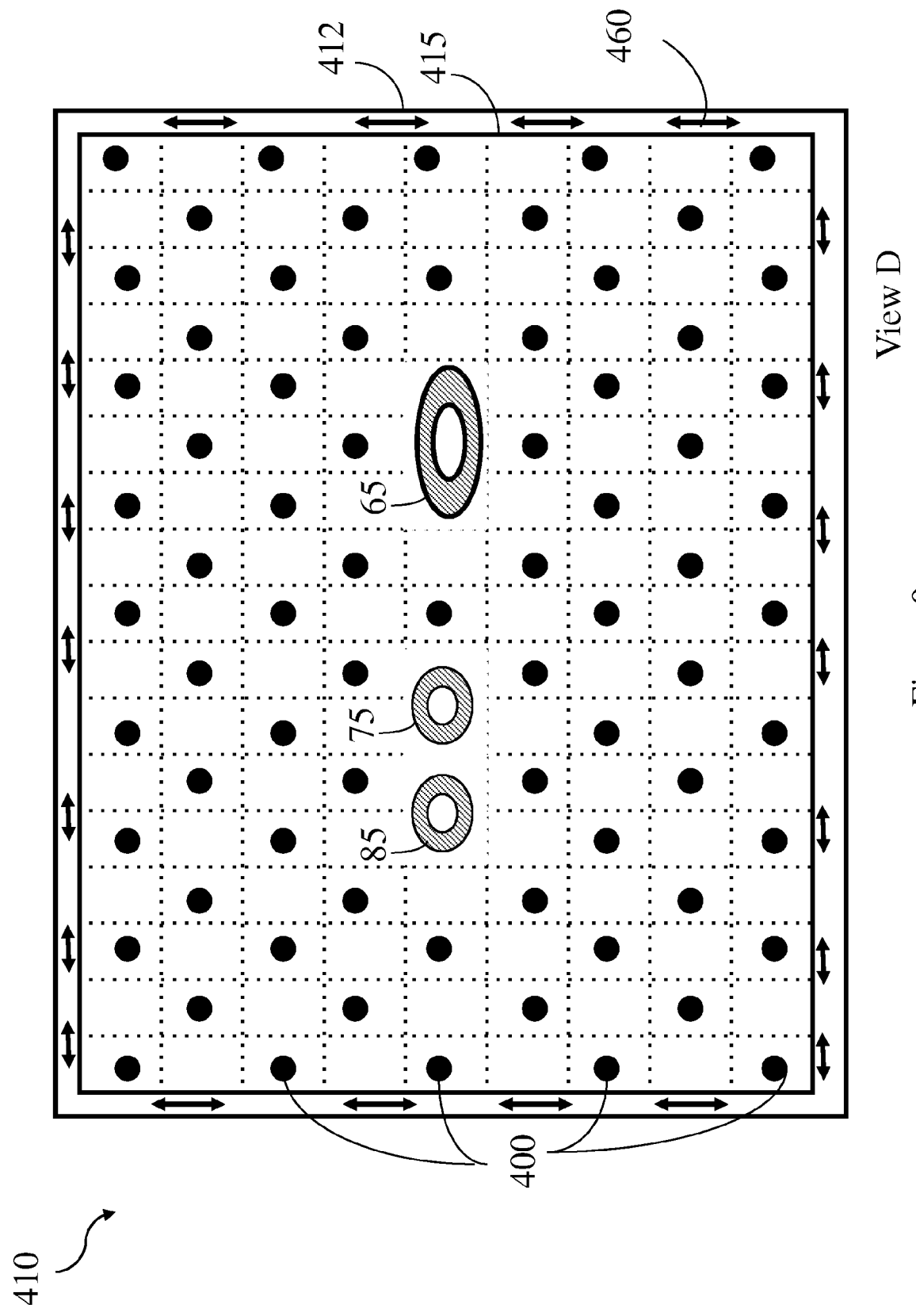
FIG. 9 is a diagram illustrating an inside view of the spray device top of the portable spray device of FIG. 4.

FIG. 9 shows an inside view of the spray device top (410) of the portable spray device (50) of FIG. 4. View D of FIG. 8 shows the plurality of connectors of the inner stratum (415) of the spray device top (410) for connecting the nozzles base connectors of the plurality of spray nozzles (400). View D also shows the A-connector (65), the B-connector (75), the C-connector (85), and the spray device cavity (460) between the inner stratum (415) and the outer stratum (412) of the spray device top (410).

Figure 10:
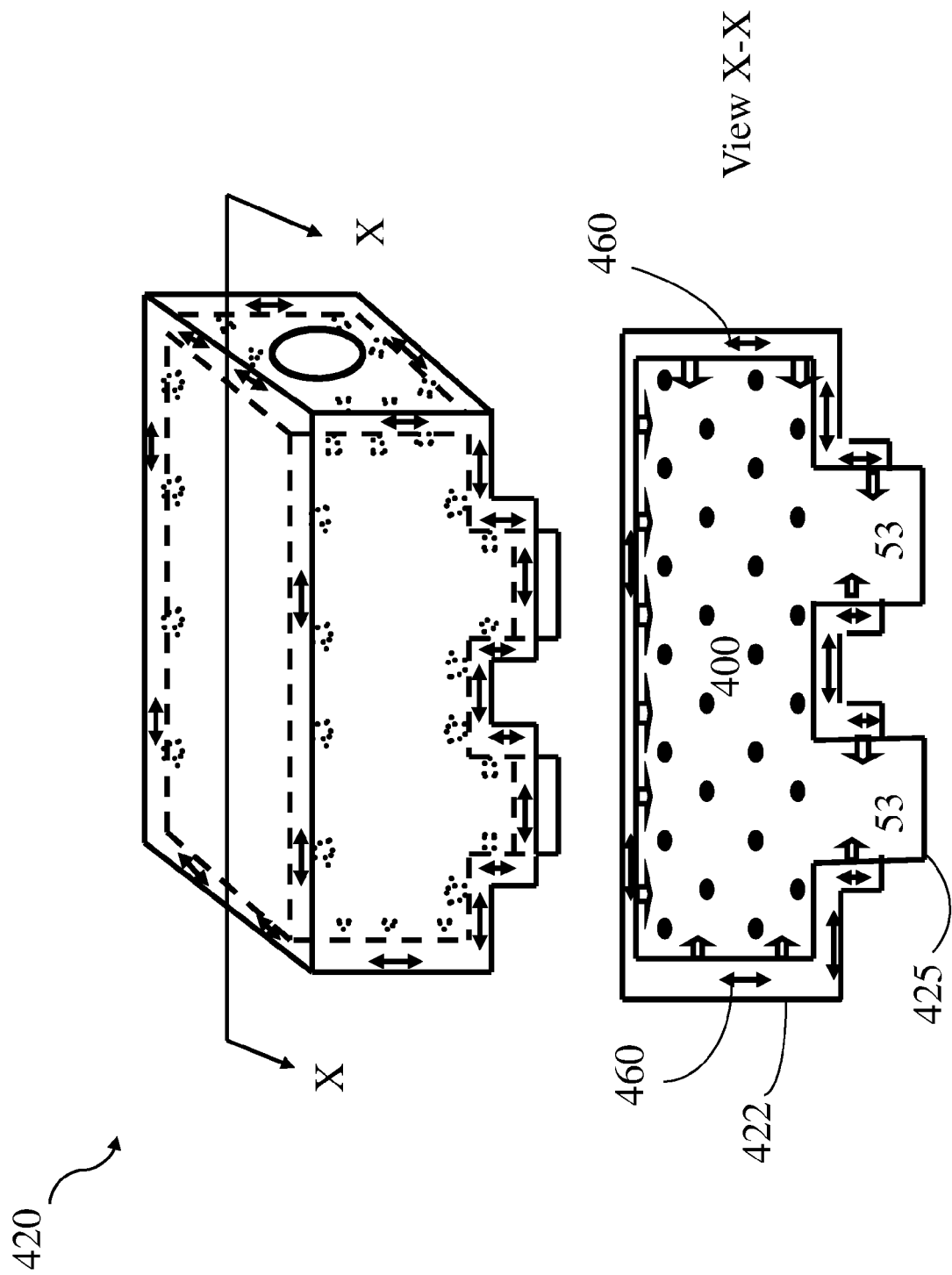
FIG. 10 is an enlarged section taken through a spray device bottom of the portable spray device of FIG. 4.

FIG. 10 shows an enlarged section taken through the spray device bottom (420) of the portable spray device (50) of FIG. 4. View X-X shows the spray device cavity (460) between the inner stratum (425) and the outer stratum (422) of the spray device bottom (420) and the plurality of connectors of the inner stratum (425) of the spray device bottom (420) for connecting the nozzles base connectors of the plurality of spray nozzles (400).

FIG. 11 shows another enlarged section taken through the spray device bottom (420) of the portable spray device (50) of FIG. 4. View Y-Y shows the spray device cavity (460) between the inner stratum (425) and the outer stratum (422) of the spray device bottom (420) and the plurality of connectors of the inner stratum (425) of the spray device bottom (420) for connecting the nozzles base connectors of the plurality of spray nozzles (400).

Figure 12:
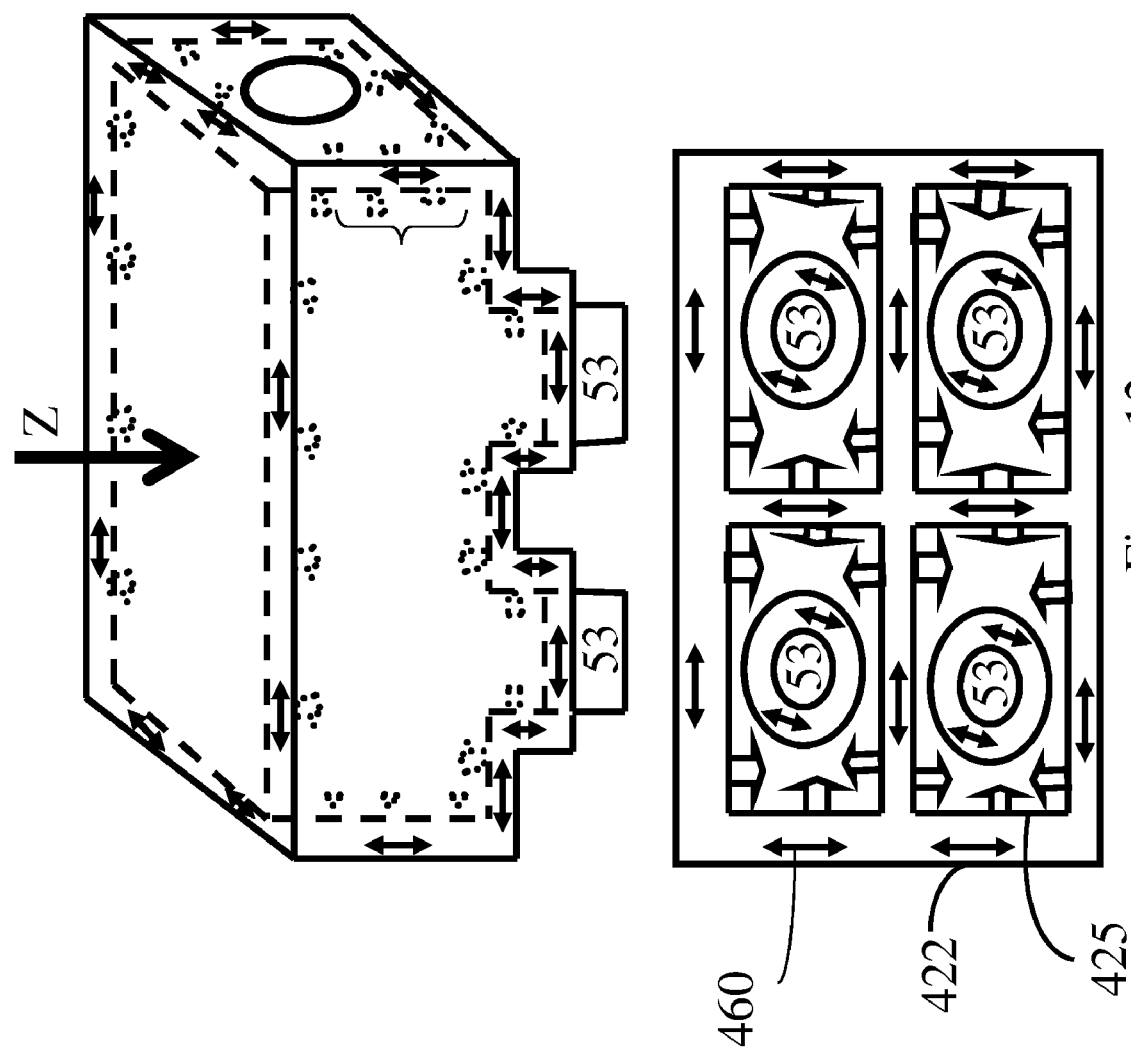
FIG. 12 is a diagram illustrating an inside view of the spray device bottom of the portable spray device of FIG. 4.

FIG. 12 shows an inside view of the spray device bottom (420) of the portable spray device (50) of FIG. 4. View Z shows the spray device cavity (460) between the inner stratum (425) and the outer stratum (422) of the spray device bottom (420) and the plurality of connectors of the inner stratum (425) of the spray device bottom (420) for connecting the nozzles base connectors of the plurality of spray nozzles (400). The view also shows the spray device cavity (460) around the four legs (shown collectively as 53) of the pet-shape body (52) of the portable spray device (50).

FIG. 13 shows a diagram illustrating an air blower (60) which comprises a housing (160) which contains an air blower selector switch (161) having cold, warm, hot, and off positions; a fan (162); a heater (163); an air blower inlet (164); and an air blower outlet (165). The air blower outlet (165) of the air blower (60) is connected to the A-connector (65) on the spray device top (410) of the portable spray device (50) of FIG. 4.

Figure 14:
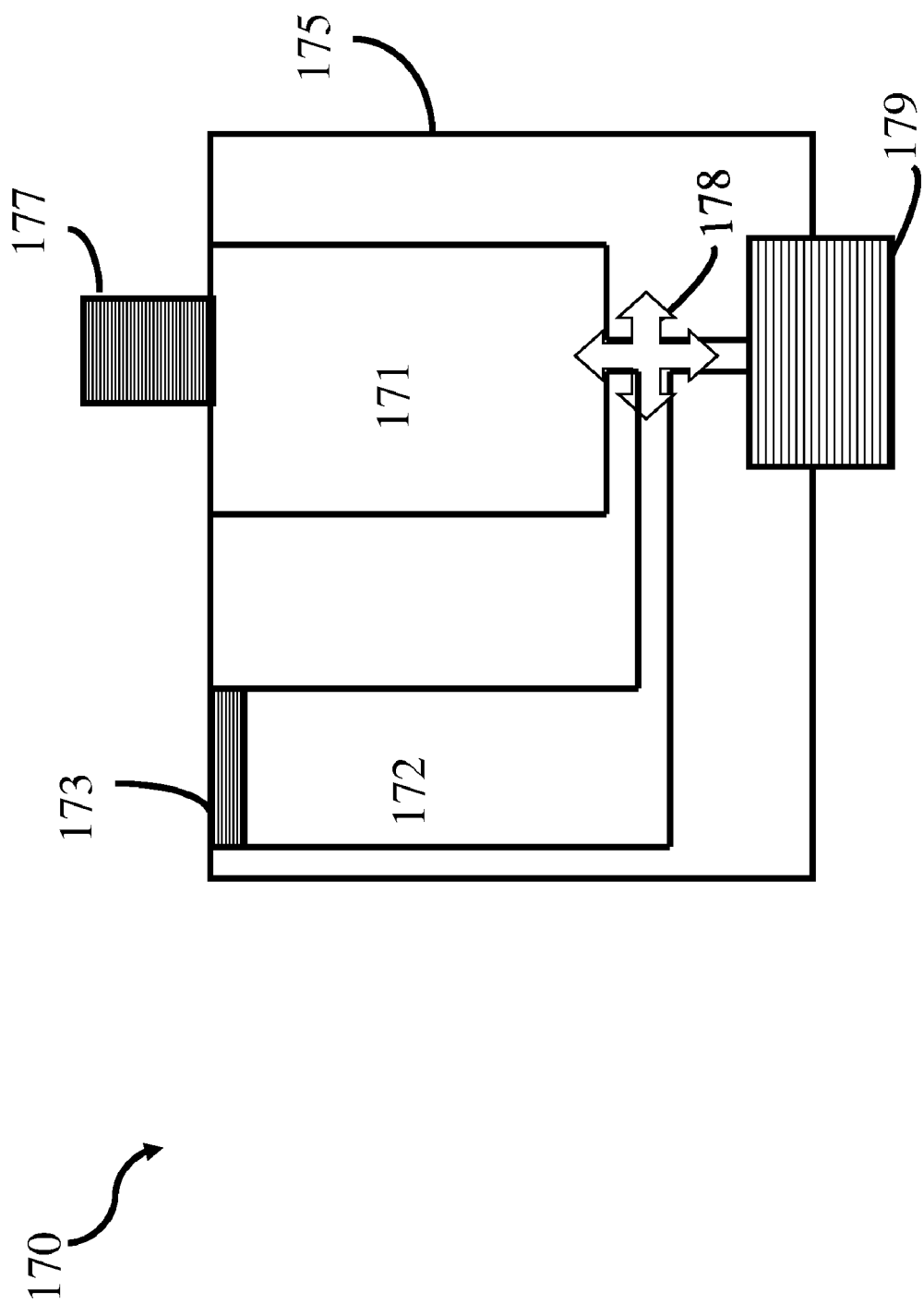
FIG. 14 is a diagram illustrating a wash and rinse apparatus.

FIG. 14 shows a diagram illustrating a wash and rinse apparatus (170) comprises a housing (175) which contains a water inlet (177); a water reservoir (171); a liquid composition reservoir (172); a liquid composition inlet (173); a wash and rinse outlet (179); and a wash and rinse selector switch (178) having wash, rinse, and off positions. The liquid composition reservoir (172) contains soap or shampoo liquid composition for pets' washing. The wash and rinse outlet (179) of the wash and rinse apparatus (170) is connected to either the B-connector (75) or the C-connector (85) on the spray device top (410) of the portable spray device (50) of FIG. 4.

Figure 15:
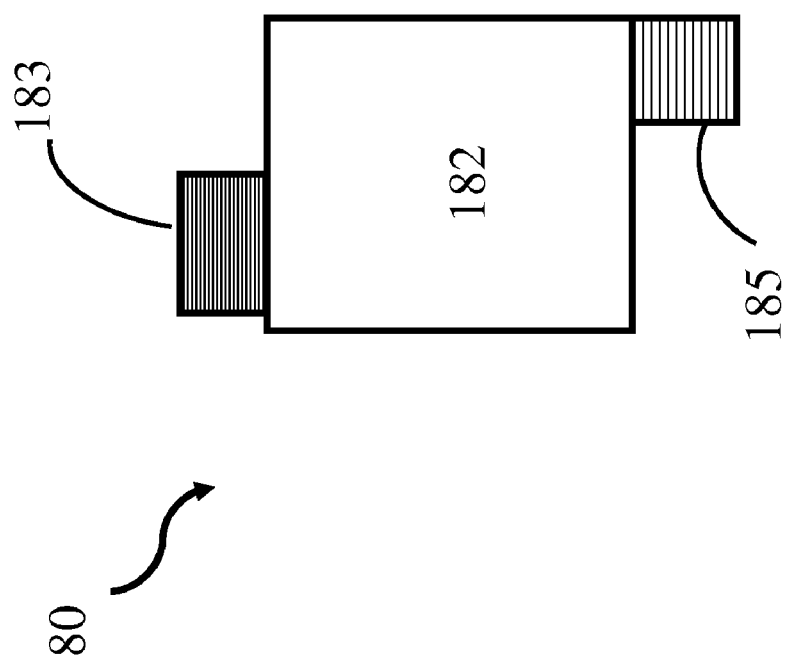
FIG. 15 is a diagram illustrating a liquid composition apparatus.

FIG. 15 shows a diagram illustrating a liquid composition apparatus (80) comprises a liquid composition reservoir (182); a liquid composition inlet (183); and a liquid composition outlet (185). The liquid composition outlet (185) of the liquid composition apparatus (80) is connected to either the C-connector (85) or the B-connector (75) on the spray device top (410). The liquid composition apparatus (80) contains soap, shampoo, medical, or non-medical liquid composition for pets' washing and pets' skin and hair treatment.

A commercial hose, such as the hose (70) of FIG. 2, would have a hose inlet, a hose outlet, and a hosepipe. The hose inlet is connected to a faucet with built-in selector switch having cold, warm, hot, and off positions (not shown) and the faucet is connected to a water supply on premises (not shown). The hose outlet is connected to the B-connector (75) on the spray device top (410) of the portable spray device (50), the C-connector (85) on the spray device top (410) of the portable spray device (50), or to the water inlet (177) of the wash and rinse apparatus (170).

The embodiments of the present invention provide at least four possible configurations for the hose (70), the wash and rinse apparatus (170), the liquid composition apparatus (80), and the air blower (60) for automatically washing, rinsing, purifying, and drying the pets.

In a first configuration, the hose inlet of the hose (70) is connected to the faucet and the hose outlet of the hose (70) is connected to the water inlet (177) of the wash and rinse apparatus (170) for filling up the water reservoir (171) of the wash and rinse apparatus (170) with water. The liquid composition inlet (173) of the wash and rinse apparatus (170) is connected to a liquid composition source for filling up the liquid composition reservoir (172) with soap or shampoo liquid composition for pets' washing. The wash and rinse outlet (179) of the wash and rinse apparatus (170) is connected to the B-connector (75) on the spray device top (410) of the portable spray device (50) for supplying water and liquid compositions for pets' washing and rinsing. The liquid composition outlet (185) of the liquid composition apparatus (80) is connected to the C-connector (85) on the spray device top (410) of the portable spray device (50) for supplying liquid composition for pets' skin and hair treatment. The air blower outlet (165) of the air blower (60) is connected to the A-connector (65) on the spray device top (410) of the portable spray device (50) for supplying air flow to dry the pets.

In a second configuration, the hose inlet of the hose (70) is connected to the faucet and the hose outlet of the hose (70) is connected to the water inlet (177) of the wash and rinse apparatus (170) for filling up the water reservoir (171) of the wash and rinse apparatus (170) with water. The liquid composition inlet (173) of the wash and rinse apparatus (170) is connected to a liquid composition source for filling up the liquid composition reservoir (172) with soap or shampoo liquid composition for pets' washing. The wash and rinse outlet (179) of the wash and rinse apparatus (170) is connected to the C-connector (85) on the spray device top (410) of the portable spray device (50) for supplying water and liquid compositions for pets' washing and rinsing. The liquid composition outlet (185) of the liquid composition apparatus (80) is connected to the B-connector (75) on the spray device top (410) of the portable spray device (50) for supplying liquid composition for pets' skin and hair treatment. The air blower outlet (165) of the air blower (60) is connected to the A-connector (65) on the spray device top (410) of the portable spray device (50) for supplying air flow to dry the pets.

In a third configuration, the hose inlet of the hose (70) is connected to the faucet and the hose outlet of the hose (70) is connected to the B-connector (75) on the spray device top (410) of the portable spray device (50) for supplying water. The liquid composition inlet (183) of the liquid composition apparatus (80) is connected to a liquid composition source for filling up the liquid composition reservoir (182) with soap, shampoo, medical, or non-medical liquid composition for pets' washing and pets' skin and hair treatment. The liquid composition outlet (185) of the liquid composition apparatus (80) is connected to the C-connector (85) on the spray device top (410) of the portable spray device (50) for supplying soap, shampoo, medical, or non-medical liquid composition for pets' washing and pets' skin and hair treatment. The air blower outlet (165) of the air blower (60) is connected to the A-connector (65) on the spray device top (410) of the portable spray device (50) for supplying air flow to dry the pets.

In a fourth configuration, the hose inlet of the hose (70) is connected to the faucet and the hose outlet of the hose (70) is connected to the C-connector (85) on the spray device top (410) of the portable spray device (50) for supplying water. The liquid composition inlet (183) of the liquid composition apparatus (80) is connected to a liquid composition source for filling up the liquid composition reservoir (182) with soap, shampoo, medical, or non-medical liquid composition for pets' washing and pets' skin and hair treatment. The liquid composition outlet (185) of the liquid composition apparatus (80) is connected to the B-connector (75) on the spray device top (410) of the portable spray device (50) for supplying soap, shampoo, medical, or non-medical liquid composition for pets' washing and pets' skin and hair treatment. The air blower outlet (165) of the air blower (60) is connected to the A-connector (65) on the spray device top (410) of the portable spray device (50) for supplying air flow to dry the pets.

The hosepipe of the hose (70) is sufficient in length to connect the hose inlet of the hose (70) to the faucet and the hose outlet of the hose (70) to the B-connector (75) on the spray device top (410) of the portable spray device (50), the C-connector (85) on the spray device top (410) of the portable spray device (50), or the water inlet (177) of the wash and rinse apparatus (170).

Figure 16:
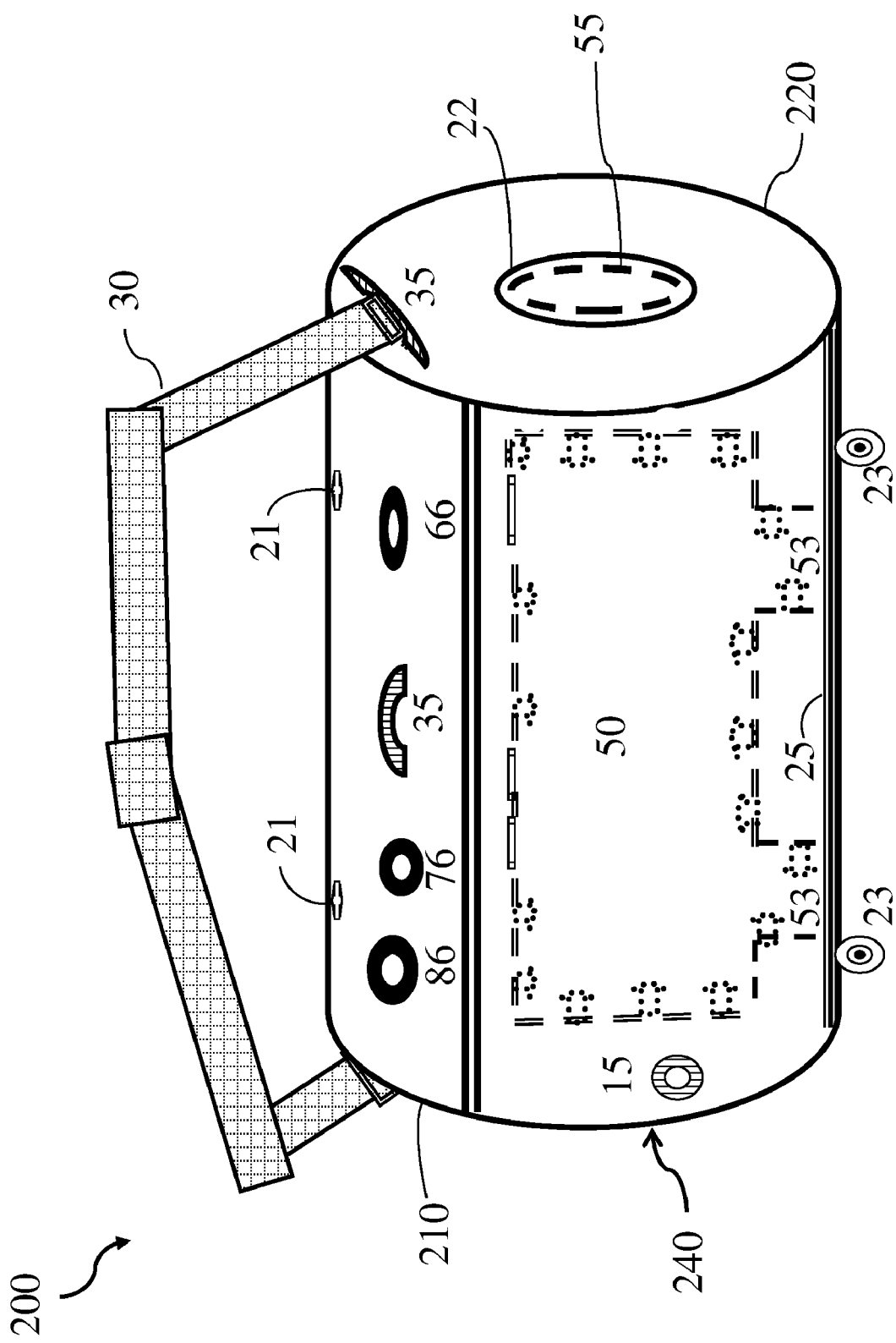
FIG. 16 is a diagram illustrating another embodiment of a portable grooming device for pets which has a housing container having a cylindrical shape.

FIG. 16 shows a diagram illustrating a portable grooming device (200) for pets which comprises a housing container (240) having a cylindrical shape. The housing container (240) comprises a housing container cover (210) and a hollow bottom container (220). The housing container cover (210) and the hollow bottom container (220) are formed by cylindrical shape sheets of light fiber glass and plastic materials. The portable spray device (50) is situated inside the housing container (240) and is formed by rectangular shape sheets of light fiber glass and plastic materials.

Figure 17:
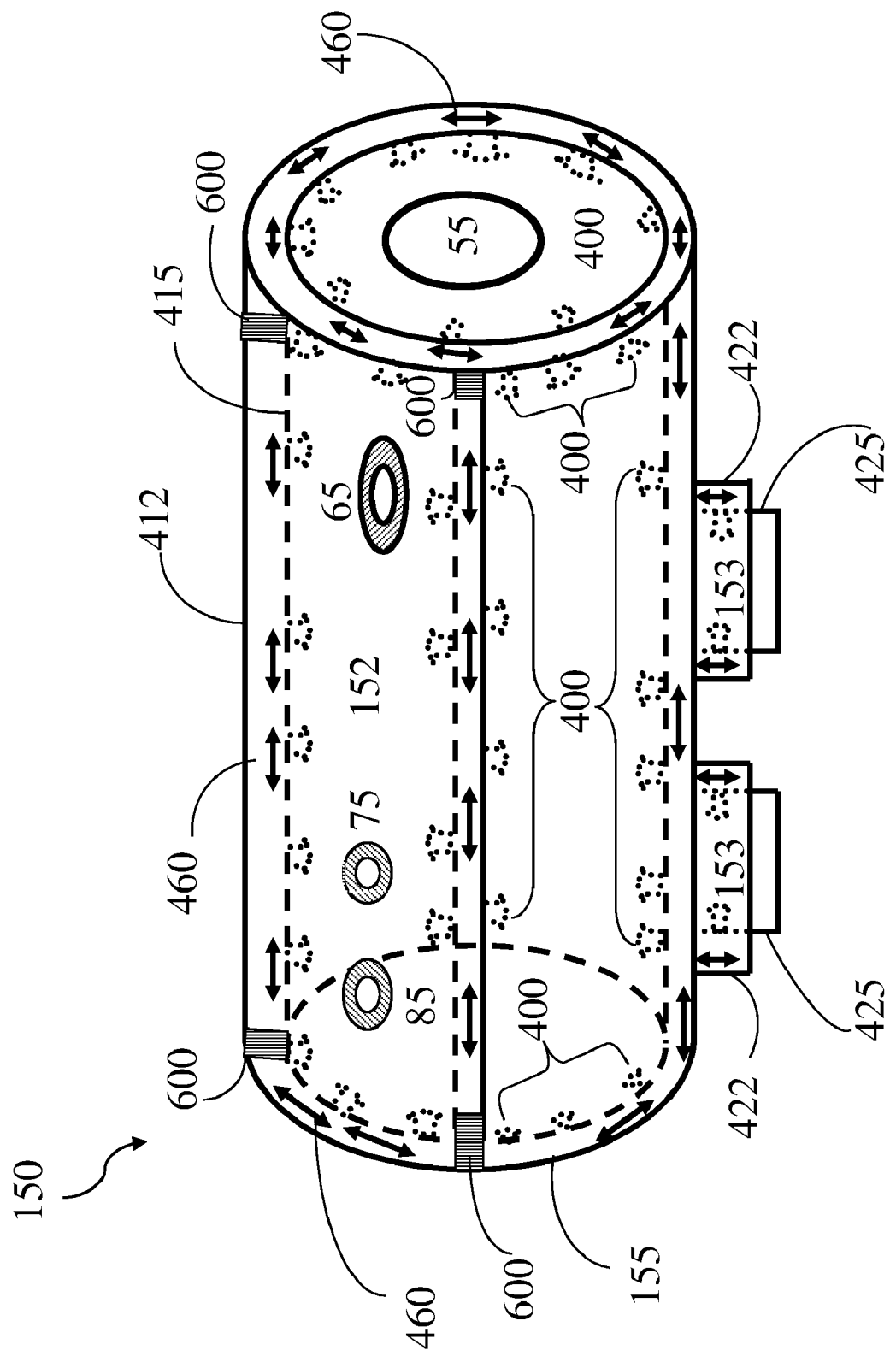
FIG. 17 is a diagram illustrating another embodiment of a portable spray device to automatically cleanse and dry pets having a cylindrical shape.

FIG. 17 shows a diagram illustrating a portable spray device (150) having a cylindrical shape. The portable spray device (150) comprises a spray device top (152) and a pet-shape body (155) having four legs (shown collectively as 153). The portable spray device (150) is formed by cylindrical shape sheets of light fiber glass and plastic materials.

Figure 18:
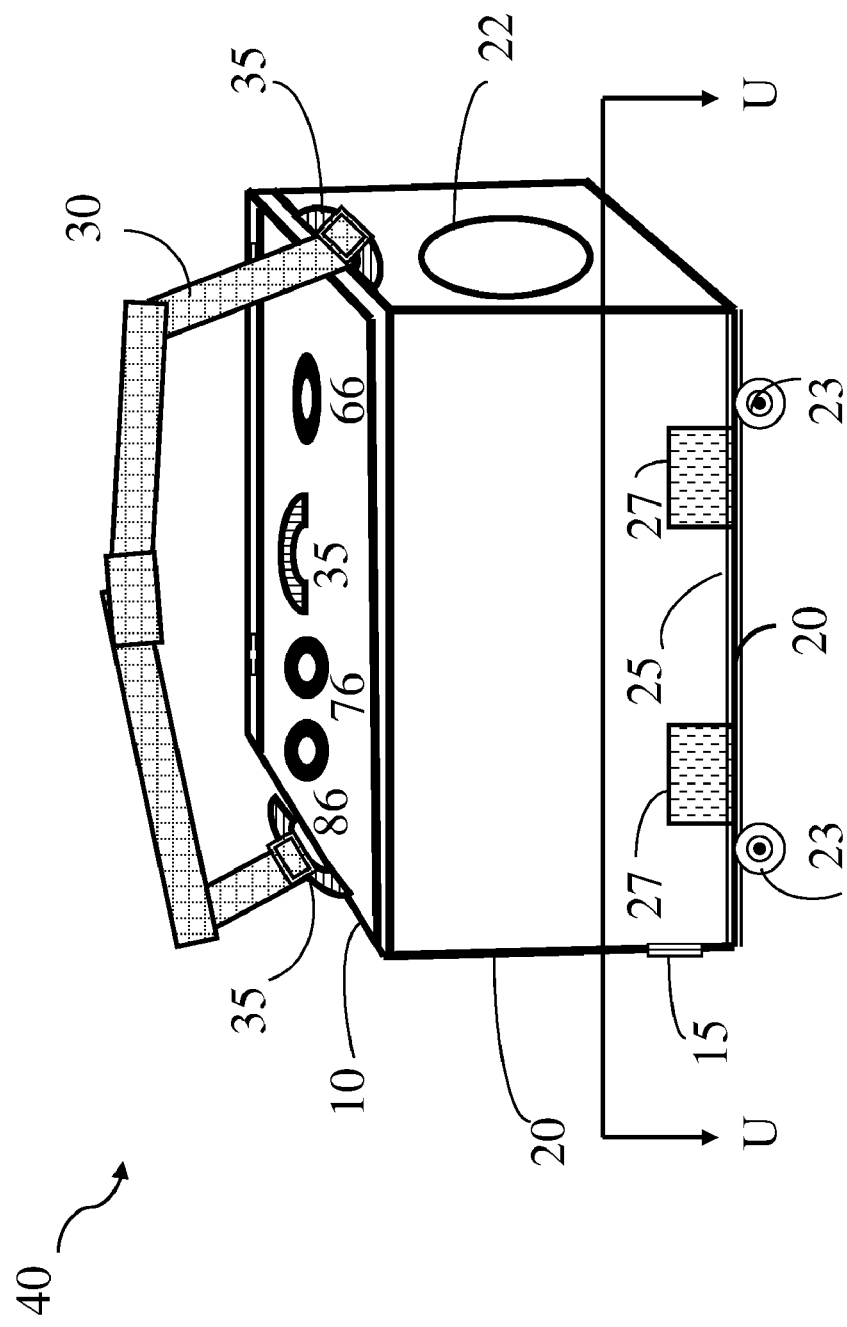
FIG. 18 is a diagram illustrating a housing container of the portable grooming device of FIG. 1.

FIG. 18 shows a diagram illustrating the housing container (40) of the portable grooming device (100) of FIG. 1. The housing container (40) comprises homing legs (shown collectively as 27) for receiving the four legs (shown collectively as 53) of the portable spray device (50) when the portable spray device (50) is situated inside the housing container (40). The housing container (40) also comprises a perforated mat (25) for draining waste water and liquid composition away from the pet's rear and front legs.

Figure 19:
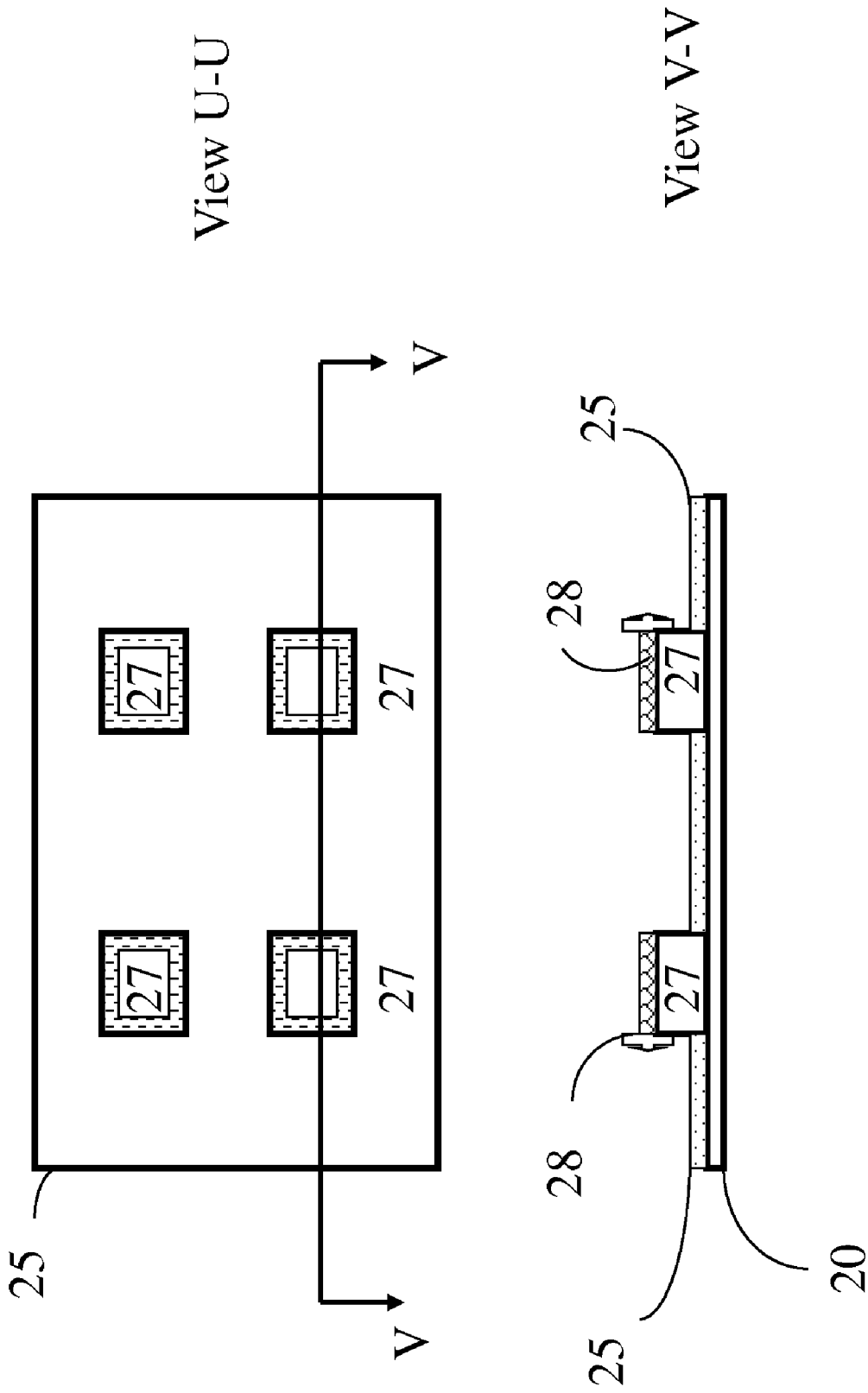
FIG. 19 is a diagram illustrating an inside view of the hollow bottom container of the housing container of FIG. 18.

FIG. 19 shows a diagram illustrating the homing legs (shown collectively as 27) which are formed inside the hollow bottom container (20) of FIG. 18 for receiving the four legs (shown collectively as 53) of the portable spray device (50) when the portable spray device (50) is situated inside the housing container (40), as shown in view U-U. View V-V shows the homing legs (shown collectively as 27) having lock and release mechanism (shown collectively as 28) for locking each of the four legs (shown collectively as 53) of the portable spray device (50) inside the homing legs (shown collectively as 27) of the hollow bottom container (20), and for releasing each of the four legs (shown collectively as 53) of the portable spray device (50) from the homing legs (shown collectively as 27) of the hollow bottom container (20). The homing legs (shown collectively as 27) and the lock and release mechanism (shown collectively as 28) ensure stability of the portable spray device (50) during the wash, rinse, purify, and dry processes.

Figure 20:
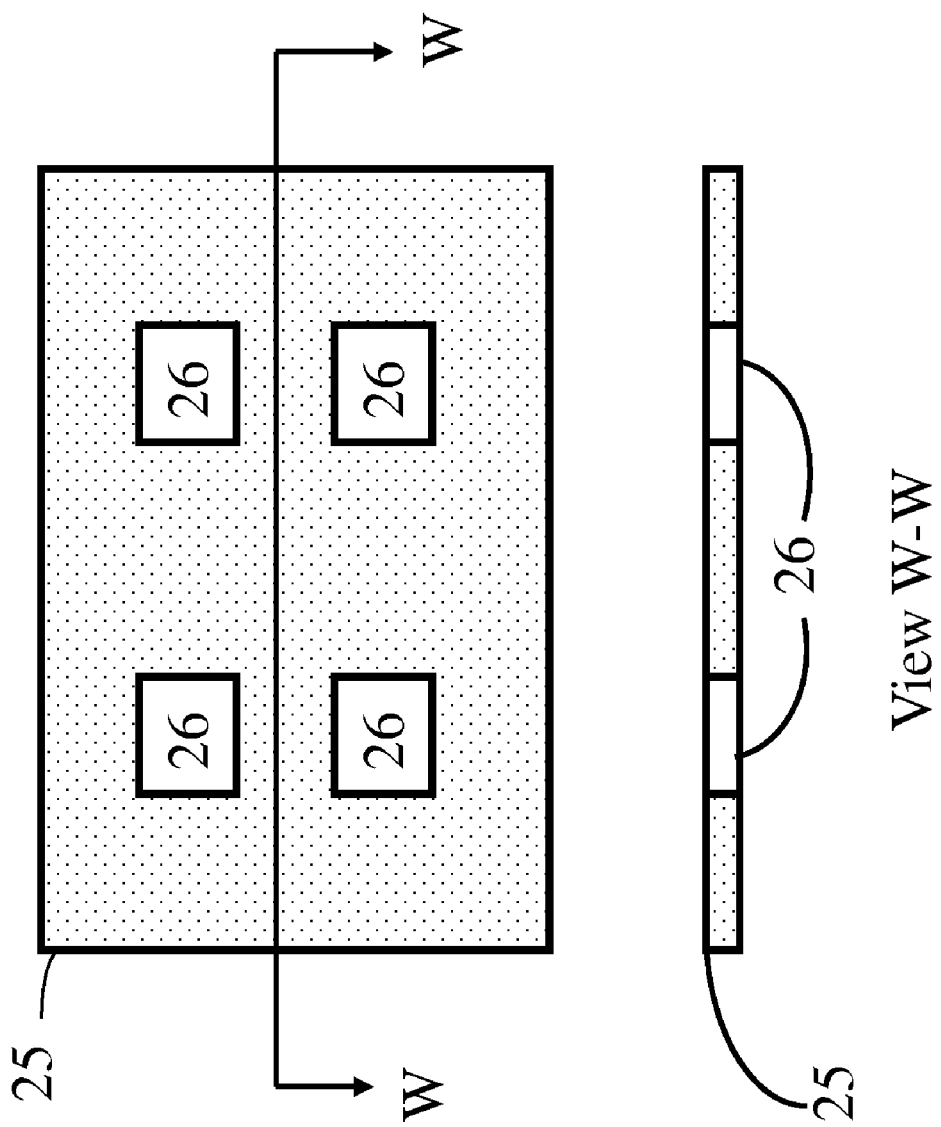
FIG. 20 is a diagram illustrating a perforated mat of the housing container of FIG. 18.

FIG. 20 shows a diagram illustrating the perforated mat (25) of the housing container (40) of FIG. 18. The perforated mat (25) has four mat openings (shown collectively as 26) which are positioned under the homing legs (shown collectively as 27) of the hollow bottom container (20) of the housing container (40) of FIGS. 18 and 19. View W-W shows an enlarged section taken through the perforated mat (25). The perforated mat (25) drains waste water and liquid composition away from the pet's rear and front legs.

The portable grooming device (FIGS. 1 and 16) and the portable spray device (FIGS. 4 and 17) to automatically cleanse (wash, rinse, and purify) and dry pets vary in sizes from breed to breed to securely accommodate small-size, medium-size, large-size, or extra large-size household pets such as cats, dogs, birds, and the like.

The sizes of the portable grooming device (FIGS. 1 and 16) and the portable spray device (FIGS. 4 and 17) depend on the height of the pet which is referred to as H in the table below. The height of the pet (that is, H) is measured by taking a perpendicular line from the top of the shoulder blade to the ground with the coat parted or so pushed down that this measurement will show only the actual height of the frame or structure of the pet.

For illustration, approximate dimensions (height, width, and length) of the portable spray device (50, 150) and the housing container (40, 240) for dogs of a height of 20 inches (50 centimeters), 25 inches (63 centimeters), and 30 inches (75 centimeters) are as follows (where "in" and "cm" referred to inches and centimeters, respectively):

| Pet's height (H) | | Portable spray device (50, 150) | | | | | | Housing container (40, 240) | | | | | |
|---|---|---|---|---|---|---|---|---|---|---|---|---|---|
| | | Height (=2 * H) | | Width (=1.1 * H) | | Length (=2.1 * H) | | Height (=2.2 * H) | | Width (=1.3 * H) | | Length (=2.3 * H) | |
| in | cm | in | cm | in | cm | in | cm | in | cm | in | cm | in | cm |
| 20 | 50 | 40 | 100 | 22 | 56 | 42 | 105 | 44 | 110 | 26 | 65 | 46 | 115 |
| 25 | 63 | 50 | 126 | 28 | 70 | 53 | 133 | 55 | 139 | 33 | 82 | 58 | 145 |
| 30 | 75 | 60 | 150 | 33 | 83 | 63 | 158 | 66 | 165 | 39 | 98 | 69 | 173 |

Advantageously, the housing container (40, 240) and the portable spray device (50, 150) are made of light fiber glass and plastic materials for carrying and transporting the portable grooming device (100, 200) and the portable spray device (50, 150) from one place to another. The housing container (40, 240) and the portable spray device (50, 150) have cylindrical shapes, rectangular shapes, or the like.

In an operation, a process to automatically cleanse and dry a pet having four legs (left and right front legs and left and right rear legs), a neck, a head, a body, and a tail comprises the steps of placing the portable spray device (50) on the floor (or on a table having a flat surface) close to a faucet which is connected to a water supply on premises. The faucet has a built-in selector switch having cold, warm, hot, and off positions.

The steps of the process include opening the spray device top (410); placing the pet inside the pet-shape body (52); ensuring the pet's head is outside the spray device opening (55) and the pet's front and rear legs are positioned within the four legs (shown collectively as 53) of the portable spray device (50); and closing the portable spray device (50) with the spray device top (410).

The process also comprises the steps of connecting wash, purify, rinse, and dry apparatus to the portable spray device (50) and performing a wash cycle, a purify cycle, a rinse cycle, and a dry cycle, as appropriate, to wash, purify, rinse, and dry the pet's neck, body, tail, and four legs. The wash cycle, the purify cycle, the rinse cycle, and the dry cycle are described below. After completing the wash, purify, rinse, and dry cycles; opening the spray device top (410) of the portable spray device (50) to retrieve the clean and dry pet from the portable spray device (50).

The wash cycle comprises the steps of connecting the wash and rinse outlet (179) of the wash and rinse apparatus (170) to the B-connector (75) on the portable spray device (50); and ensuring the B-selector switch (77) is in "off" position. Then, connecting the hose inlet of the hose (70) to the faucet and the hose outlet to the water inlet (177) of the wash and rinse apparatus (170).

The wash cycle further comprises the steps of filling up the liquid composition reservoir (172) with soap or shampoo liquid composition for washing the pet; adjusting the temperature of the water and opening the faucet to continuously fill up the water reservoir (171) with water; setting the B-selector switch (77) to "on" position to allow the flow of water; and setting the wash and rinse selector switch (178) to "wash" position to allow the flow of the liquid composition.

Continuing the flow of the water and liquid composition through the spray device cavity (460) of the portable spray device (50) where the spray nozzles (400) spray the pet's neck, body, tail, and four legs for a period of time; and then, switching the wash and rinse selector switch (178) to "off" position to stop the flow of the water and liquid composition.

The rinse cycle comprises the steps of setting the wash and rinse selector switch (178) of the wash and rinse apparatus (170) to "rinse" position to allow the flow of water; and continuing the flow of the water through the spray device cavity (460) of the portable spray device (50) where the spray nozzles (400) spray the pet's neck, body, tail, and four legs for a period of time. Then, switching the wash and rinse selector switch (178) to "off" position to stop the flow of water.

The purify cycle comprises the steps of setting the wash and rinse selector switch (178) of the wash and rinse apparatus (170) to "rinse" position to allow the flow of water; connecting the liquid composition apparatus (80) to the C-connector (85); and ensuring the C-selector switch (87) is in "off" position.

Filling up the liquid composition apparatus (80) with medical or non-medical liquid composition for pet's skin and hair treatment; and setting the C-selector switch (87) to "on" position to allow the flow of the liquid composition.

Continuing the flow of the water and liquid composition through the spray device cavity (460) of the portable spray device (50) where the spray nozzles (400) spray the pet's neck, body, tail, and four legs for a period of time. Then, switching the C-selector switch (87) to "off" position to stop the flow of the liquid composition; switching the wash and rinse selector switch (178) to "off" position; switching the B-selector switch (77) to "off" position to stop the flow of water; and closing the faucet.

The dry cycle comprises the steps of connecting the air blower (60) to the A-connector (65) and ensuring the A-selector switch (67) is in "off" position; adjusting the temperature of the air flow of the air blower (60); and setting the A-selector switch (67) to "on" position to allow the flow of air.

Continuing the flow of air through the spray device cavity (460) of the portable spray device (50) where the spray nozzles (400) spray the pet's neck, body, tail, and four legs for a period of time; and then, switching the A-selector switch (67) to "off" position to stop the flow of air from the air blower (60).

In another operation, a process for grooming a pet having four legs (left and right front legs and left and right rear legs), a neck, a head, a body, and a tail comprises the steps of placing the portable grooming device (100) on the floor (or on a table having a flat surface) close to a faucet which is connected to a water supply on premises. The faucet has a built-in selector switch having cold, warm, hot, and off positions. Then, opening the housing container cover (10) of the housing container (40) and removing the spray device top (410) of the portable spray device (50).

The process comprises the steps of placing the pet inside the pet-shape body (52); ensuring the pet's head is outside the housing container opening (22) and the spray device opening (55) and the pet's front and rear legs are positioned within the four legs (shown collectively as 53) of the portable spray device (50); and closing the portable spray device (50) with the spray device top (410) and the housing container (40) with the housing container cover (10).

The process further comprises the steps of connecting wash, purify, rinse, and dry apparatus to the portable spray device (50) and performing a wash cycle, a purify cycle, a rinse cycle, and a dry cycle, as appropriate, to wash, purify, rinse, and dry the pet's neck, body, tail, and four legs. The wash cycle, the purify cycle, the rinse cycle, and the dry cycle are described below. After completing the wash, rinse, purify, and dry cycles, opening the housing container cover (10) of the housing container (40) and the spray device top (410) of the portable spray device (50) to retrieve the clean and dry pet from the portable spray device (50).

The wash cycle comprises the steps of connecting the hose outlet of the hose (70) to the B-connector (75) and ensuring the B-selector switch (77) is in "off" position; connecting the hose inlet of the hose (70) to the faucet; opening the faucet and adjusting the temperature of the water; and setting the B-selector switch (77) to "on" position to allow the flow of water.

Connecting the liquid composition apparatus (80) to the C-connector (85) and ensuring the C-selector switch (87) is in "off" position; filling up the liquid composition apparatus (80) with soap or shampoo liquid composition for washing the pet; and setting the C-selector switch (87) to "on" position to allow the flow of the liquid composition.

Continuing the flow of the water and liquid composition through the spray device cavity (460) of the portable spray device (50) where the spray nozzles (400) spray the pet's neck, body, tail, and four legs for a period of time; and then, switching the C-selector switch (87) to "off" position to stop the flow of the liquid composition.

The rinse cycle comprises the steps of continuing the flow of the water through the spray device cavity (460) of the portable spray device (50) where the spray nozzles (400) spray the pet's neck, body, tail, and four legs for a period of time; and then, switching the B-selector switch (77) to "off" position to stop the flow of water.

The purify cycle comprises the steps of setting the B-selector switch (77) to "on" position to allow the flow of water; filling up the liquid composition apparatus (80) with medical or non-medical liquid composition for pet's skin and hair treatment; and setting the C-selector switch (87) to "on" position to allow the flow of the liquid composition.

Continuing the flow of the water and liquid composition through the spray device cavity (460) of the portable spray device (50) where the spray nozzles (400) spray the pet's neck, body, tail, and four leg for a period of time; switching the C-selector switch (87) to "off" position to stop the flow of the liquid composition; switching the B-selector switch (77) to "off" position to stop the flow of water; and closing the faucet.

The dry cycle comprises the steps of connecting the air blower (60) to the A-connector (65) and ensuring the A-selector switch (67) is in "off" position; adjusting the temperature of the air flow of the air blower (60) and setting the A-selector switch (67) to "on" position to allow the flow of air; continuing the flow of air through the spray device cavity (460) of the portable spray device (50) where the spray nozzles (400) spray the pet's neck, body, tail, and four legs for a period of time; and then, switching the A-selector switch (67) to "off" position to stop the flow of air from the air blower (60).

Conveniently, the embodiments of this invention provide portable devices and processes to automatically wash, rinse, purify, and dry pets. The devices are portable and easy to operate. Pets of small-size, medium-size, large-size, and extra large-size can be easily wash, rinse, purify, and dry by their owners at home which, in turn, eliminate the cost of pets' grooming. Moreover, professionals who rescue and take care of domestic and wild animals (of interest, birds and wild animals covered with pollutants due to oil leaks from ships pass through waterways) can also use the portable devices to automatically wash, rinse, purify, and dry the birds and wild animals.

It will be apparent to those with skill in the art that modifications to the above embodiments can occur without deviating from the scope of the present invention. Accordingly, the disclosures and descriptions herein are intended to be illustrative, but not limiting, of the scope of the invention which is set forth in the following claims.

What is claim is:

1. A portable spray device to automatically cleanse and dry pets comprising:
    a pet-shape body with four legs having a hollow interior for placing a pet inside the portable spray device;
    a spray device opening formed on the pet-shape body for a pet's head;
    plurality of spray nozzles having spray nozzles heads and nozzles base connectors, wherein the nozzles base connectors are connected to the pet-shape body with four legs with the spray nozzles heads are directed toward the hollow interior of the pet-shape body with four legs;
    plurality of connectors formed on the pet-shape body for connecting a hose connected to a water source, a wash and rinse apparatus, a liquid composition apparatus, and an air blower for supplying water, liquid composition, and air flow to the pet-shape body with four legs; and
    a spray device cavity formed within the pet-shape body with four legs for channeling the water, the liquid composition, and the air flow to the plurality of spray nozzles where the spray nozzles heads spray the water, the liquid composition, and the air flow on the pet.

2. The portable spray device as described in claim 1, wherein the pet-shape body with four legs comprises:
    a spray device top having a built-in flexible lock and release mechanism, an inner stratum with built-in plurality of connectors, and an outer stratum, wherein the inner stratum and the outer stratum form a top device cavity herein between; and
    a spray device bottom comprises an inner stratum with built-in plurality of connectors and an outer stratum, wherein the inner stratum and the outer stratum form a bottom device cavity herein between.

3. The portable spray device as described in claim 2, wherein the spray device cavity within the pet-shape body with four legs is formed by connecting the top device cavity and the bottom device cavity using the built-in flexible lock and release mechanism of the spray device top; and wherein the nozzles base connectors are connected to the plurality of connectors on the inner stratum of the spray device top and the spray device bottom of the pet-shape body with four legs.

4. The portable spray device as described in claim 3, wherein the plurality of connectors comprise an A-connector which has an A-selector switch having "on" and "off" positions, a B-connector which has a B-selector switch having "on" and "off" positions, and a C-connector which has a C-selector switch having "on" and "off" positions.

5. The portable spray device as described in claim 4, wherein the wash and rinse apparatus comprises a housing which contains a water inlet, a water reservoir, a liquid composition reservoir, a liquid composition inlet, a wash and rinse outlet, and a wash and rinse selector switch having wash, rinse, and off positions; and wherein the wash and rinse apparatus provides water and liquid composition for pets' washing and rinsing.

6. The portable spray device as described in claim 5, wherein the liquid composition apparatus comprises a liquid composition reservoir, a liquid composition inlet, and a liquid composition outlet; and wherein the liquid composition apparatus contains soap, shampoo, medical, or non-medical liquid composition for pets' washing and pets' skin and hair treatment.

7. The portable spray device as described in claim 6, wherein the hose has a hose inlet, a hose outlet, and a hosepipe; wherein the hose inlet is connected to a faucet with built-in selector switch having cold, warm, hot, and off positions and the faucet is connected to a water supply on premises; and wherein the hosepipe is sufficient in length to connect the hose inlet to the faucet.

8. The portable spray device as described in claim 7, wherein the air blower comprises a housing which contains an air blower selector switch having cold, warm, hot, and off positions, a fan, a heater, an air blower inlet, and an air blower outlet; and wherein the air blower outlet of the air blower is connected to the A-connector for supplying air flow to dry the pets.

9. The portable spray device as described in claim 8, wherein the hose outlet of the hose is connected to the water inlet of the wash and rinse apparatus for filling up the water reservoir of the wash and rinse apparatus with water; the wash and rinse outlet of the wash and rinse apparatus is connected to the B-connector for supplying water and liquid compositions for pets' washing and rinsing; and the liquid composition outlet of the liquid composition apparatus is connected to the C-connector for supplying liquid composition for pets' skin and hair treatment.

10. The portable spray device as described in claim 8, wherein the hose outlet of the hose is connected to the water inlet of the wash and rinse apparatus for filling up the water reservoir of the wash and rinse apparatus with water; the wash and rinse outlet of the wash and rinse apparatus is connected to the C-connector for supplying water and liquid composition for pets' washing and rinsing; and the liquid composition outlet of the liquid composition apparatus is connected to the B-connector for supplying liquid composition for pets' skin and hair treatment.

11. The portable spray device as described in claim 8, wherein the hose outlet of the hose is connected to the B-connector for supplying water; and the liquid composition outlet of the liquid composition apparatus is connected to the C-connector for supplying liquid composition for pets' washing and pets' skin and hair treatment.

12. The portable spray device as described in claim 8, wherein the hose outlet of the hose is connected to the C-connector for supplying water; and the liquid composition outlet of the liquid composition apparatus is connected to the B-connector for supplying liquid composition for pets' washing and pets' skin and hair treatment.

13. A portable grooming device for pets comprising:
    (a) a housing container which comprises a housing container cover and a hollow bottom container having a housing container opening for a pet's head; and
    (b) a portable spray device situated inside the hollow bottom container of the housing container, wherein the portable spray device comprises:
        a pet-shape body with four legs having a hollow interior for placing a pet inside the portable spray device, a spray device opening formed on the pet-shape body for a pet's head, wherein the spray device opening and the housing container opening centers are coinciding, plurality of spray nozzles having spray nozzles heads and nozzles base connectors, wherein the nozzles base connectors are connected to the pet-shape body with four legs with the spray nozzles heads are directed toward the hollow interior of the pet-shape body with four legs, plurality of connectors formed on the pet-shape body for connecting a hose connected to a water source, a wash and rinse apparatus, a liquid composition apparatus, and an air blower for supplying water, liquid composition, and air flow to the pet-shape body with four legs, and a spray device cavity formed within the pet-shape body with four legs for channeling the water, the liquid composition, and the air flow to the plurality of spray nozzles where the spray nozzles heads spray the water, the liquid composition, and the air flow on the pet.

14. The portable grooming device as described in claim 13, wherein the housing container comprises plurality of access openings formed on the housing container cover for easy access of the plurality of connectors on the portable spray device; and wherein the plurality of connectors comprise an A-connector which has an A-selector switch having 'on' and 'off' positions, a B-connector which has a B-selector switch having 'on' and 'off' positions, and a C-connector which has a C-selector switch having 'on' and 'off' positions.

15. The portable grooming device as described in claim 14, wherein the housing container comprises:

homing legs formed inside the hollow bottom container for receiving the four legs of the portable spray device; and lock and release mechanism for locking each of the four legs of the portable spray device inside the homing legs of the hollow bottom container, and for releasing each of the four legs of the portable spray device from the homing legs of the hollow bottom container.

16. The portable grooming device as described in claim 15, wherein the housing container further comprises:

a perforated mat having four mat openings positioned under the homing legs of the hollow bottom container of the housing container for draining waste water and liquid composition away from the pet's rear and front legs; and a drain formed on the hollow bottom container of the housing container for draining waste water and liquid composition away from the portable grooming device.

17. The portable grooming device as described in claim 16, wherein the housing container further comprises:

plurality of handles formed on the housing container cover and the hollow bottom container;

plurality of hinges for connecting the housing container cover and the hollow bottom container;

a belt tied to the plurality of handles on the hollow bottom container for carrying and transporting the portable grooming device; and plurality of wheels and breaking levers system formed on the hollow bottom container for facilitating the portable grooming device moves.

18. The portable grooming device as described in claim 13, wherein the housing container and the portable spray device are formed by rectangular shape sheets of light fiber glass and plastic materials.

19. The portable grooming device as described in claim 13, wherein the housing container and the portable spray device are formed by cylindrical shape sheets of light fiber glass and plastic materials.

20. A process for grooming a pet having four legs (left and right front legs and left and right rear legs), a neck, a head, a body, and a tail, the process comprising the steps of:

placing a portable grooming device close to a faucet connected to a water supply on premises, the faucet has a built-in selector switch having cold, warm, hot, and off positions, wherein the portable grooming device comprises a housing container which comprises a housing container cover, a hollow bottom container having a housing container opening for a pet's head, and plurality of access openings formed on the housing container cover, and situated inside the housing container is a portable spray device which comprises a pet-shape body with four legs, a spray device top, a spray device bottom having a spray device opening for the pet's head, a spray device cavity, plurality of spray nozzles connected to the spray device cavity, an A-connector, a B-connector, and a C-connector formed on the spray device top, wherein the plurality of access openings on the housing container cover provide easy access to the A-connector, the B-connector and the C-connector;

opening the housing container cover and removing the spray device top;

placing the pet inside the pet-shape body and ensuring the pet's head is outside the housing container opening and the spray device opening and the pet's front and rear legs are positioned within the four legs of the portable spray device, and closing the portable spray device with the spray device top and the housing container with the housing container cover;

performing a wash cycle, a purify cycle, a rinse cycle, and a dry cycle to wash, purify, rinse, and dry the pet's neck, body, tail, and four legs; and opening the housing container cover and the spray device top to retrieve the pet from the portable spray device.

21. The process as described in claim 20, wherein the wash cycle comprises the steps of:

connecting one end of a hose to the B-connector which has a B-selector switch having "on" and "off" positions, and ensuring the B-selector switch is in "off" position;

connecting another end of the hose to the faucet;

opening the faucet and adjusting the temperature of the water;

setting the B-selector switch to "on" position to allow the flow of water;

connecting a liquid composition apparatus to the C-connector which has a C-selector switch having "on" and "off" positions, and ensuring the C-selector switch is in "off" position;

filling up the liquid composition apparatus with liquid composition for pet's washing;

setting the C-selector switch to "on" position to allow the flow of the liquid composition;

continuing the flow of the water and liquid composition through the spray device cavity where the spray nozzles spray the pet's neck, body, tail, and four legs for a period of time; and switching the C-selector switch to "off" position to stop the flow of the liquid composition.

22. The process as described in claim 21, wherein the rinse cycle comprises the steps of:

continuing the flow of the water through the spray device cavity where the spray nozzles spray the pet's neck, body, tail, and four legs for a period of time; and switching the B-selector switch to "off" position to stop the flow of water.

23. The process as described in claim 22, wherein the purify cycle comprises the steps of:

setting the B-selector switch to "on" position to allow the flow of water;

filling up the liquid composition apparatus with liquid composition for pet's skin and hair treatment;

setting the C-selector switch to "on" position to allow the flow of the liquid composition;

continuing the flow of the water and liquid composition through the spray device cavity where the spray nozzles spray the pet's neck, body, tail, and four leg for a period of time;

switching the C-selector switch to "off" position to stop the flow of the liquid composition;

switching the B-selector switch to "off" position to stop the flow of water; and closing the faucet.

24. The process as described in claim 23, wherein the dry cycle comprises the steps of:

connecting an air blower to the A-connector which has an A-selector switch having "on" and "off" positions, and ensuring the A-selector switch is in "off" position;

adjusting the temperature of the air flow of the air blower and setting the A-selector switch to "on" position to allow the flow of air;

continuing the flow of air through the spray device cavity where the spray nozzles spray the pet's neck, body, tail, and four legs for a period of time; and switching the A-selector switch to "off" position to stop the flow of air from the air blower.

* * * * *